United States Patent [19]

Peterson

[11] 4,004,062

[45] Jan. 18, 1977

[54] AQUEOUS POLYESTER COATING COMPOSITION

[75] Inventor: Marvin A. Peterson, Fort Wayne, Ind.

[73] Assignee: General Electric Company, Fort Wayne, Ind.

[22] Filed: Aug. 30, 1974

[21] Appl. No.: 501,932

Related U.S. Application Data

[63] Continuation-in-part of Ser. No. 475,483, June 3, 1974, Continuation-in-part of Ser. No. 467,615, May 6, 1974, Continuation of Ser. No. 822,899, May 8, 1969, abandoned.

[52] U.S. Cl. .................. 428/383; 260/29.2 E; 260/29.2 N; 260/75 N; 427/388 A; 427/409
[51] Int. Cl.$^2$ .............................. C08L 67/02
[58] Field of Search .......... 260/29.2 E, 29.2 N, 260/75 N; 428/379, 383; 427/388, 409

[56] References Cited

UNITED STATES PATENTS

| | | | |
|---|---|---|---|
| 3,426,098 | 2/1969 | Meyer et al. | 428/379 |
| 3,652,500 | 3/1972 | Peterson | 260/29.2 N |
| 3,663,510 | 5/1972 | Peterson | 260/29.2 N |
| 3,695,929 | 10/1972 | Sattler | 428/383 |

Primary Examiner—John C. Bleutge
Attorney, Agent, or Firm—Joseph E. Papin

[57] ABSTRACT

An aqueous coating composition containing in admixture a water soluble polyester, a water soluble orthoamic acid diamine and minor amounts of other water soluble polymeric coating materials. The water soluble orthoamic acid diamine is prepared by reacting in a suitable solvent for at least one reactant, an aromatic diamine and an aromatic dianhydride with the reactants in the molar ratio of m/(m-1) respectively, where m has a value between 2 and about 7. The diamine is dissolved in a solvent and the dianhydride is slowly added to the solution to form the orthoamic acid diamine. The reaction is carried out at a temperature below that at which imidization occurs. The reaction product may then be made water soluble by the addition of a volatile base such as ammonia or a volatile amine. Water solutions of polyester resins and the orthoamic acid diamine are utilized to produce coatings on substrates such as magnet wire. Water soluble phenol-formaldehyde resins, aminoplasts, epoxy resins and the like, and accelerators and other ingredients may be added to the coating solution. Coatings produced on substrates, including magnet wire, may be heat cured to form clear, tough, flexible, adherent solvent resistant dielectric thermally stable coatings.

37 Claims, No Drawings

AQUEOUS POLYESTER COATING COMPOSITION

CROSS REFERENCE TO RELATED APPLICATIONS

This application is a continuation-in-part of co-pending application Ser. No. 475,483, filed June 3, 1974, by Marvin A. Peterson, for "Coating Composition and Method of Coating Substrates Therewith", which application Ser. No. 475,483, is a continuation-in-part of co-pending application Ser. No. 467,615, filed May 6, 1974, by Marvin A. Peterson, for "Process and Composition for Producing Coating Material," which application Ser. No. 467,615, is co-pending with this application and a continuation of co-pending application Ser. No. 822,899, filed May 8, 1969, by Marvin A. Peterson, for "Improved Process for Producing Wire Coatings From Prepolymeric Materials," now abandoned.

FIELD OF THE INVENTION

The present invention relates to coating compositions for producing polymeric coatings on substrates, and more particularly to aqueous based polymeric coating solutions contaning water soluble polyesters or polyesterimides, or mixtures thereof, in admixture with orthoamic acid diamines. More specifically, the invention relates to a coating composition, a process for producing coating compositions of the foregoing character, a process of coating substrates therewith, coatings produced thereby, and to coated substrates. Coatings produced from the aqueous based polymeric coating solutions find particular but not necessarily exclusive utility in applications requiring electrical grade properties, including high thermal stability, dielectric strength and cut-through temperature, are curable in conventional wire tower apparatus, and are suitable for overcoating with materials such as Nylon.

BACKGROUND OF THE INVENTION

A wide variety of synthetic resins have been developed for use as electrical insulating material, particularly material which is satisfactory for use as slot insulation in dynamoelectric machines and for use as insulation for conductors which are to be employed as magnet wires (insulated electrical conductors) in electrical apparatus. It is well known that insulating material which is to be employed for these purposes must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, phenols and substituted phenols, aliphatic and aromatic hydrocarbons, halogenated carbon compounds, and the like. Insulating coatings on magnet wire must be resistant to these solvents.

In order to converse space in electrical apparatus, it is essential that the individual turns which make up the coils be maintained in close proximity to each other. Because of the closeness of the turns, and the fact that there may be a large potential gradient between adjacent turns, it is necessary that the coating resins employed as wire enamels have a high dielectric strength to prevent short circuiting between adjacent coils. In operation of electrical apparatus containing coiled wires, high temperatures are often encountered and the enamels must be able to withstand these high temperatures as well as the mechanical stresses and vibrations encountered in electrical apparatus so that the enamel coating does not soften or come off the wire.

It is also well known that the power output of motors and generators can be increased a great deal by increasing the current density in the magnet wires of these machines. However, increasing the current density through magnet wires is accompanied by an attendant rise in the operating temperature of the magnet wires. This increased temperature has meant that conventional water based organic enamels, particularly economically attractive polyester based resins, could not be used in high current density windings because the higher operating temperatures encountered caused deterioration or decomposition of the enamel coating.

In the past, many attempts have been made to prepare magnet wires which met all of the mechanical, chemical, electrical and thermal requirements of high temperature magnet wire while still being economically feasible. Cost per unit of power output of a resulting dynamoelectric machine is a very important factor in any magnet wire insulation, since an excessive magnet wire cost tends to make a magnet wire impractical for use regardless of its properties. While excessive cost of a magnet wire is generally the result of five factors, a sixth factor, that of ecology and environmental considerations in connection with the use of organic solvents, is now of prime importance.

The first, and the most obvious, factor is the cost of the raw materials in the resin which is to be applied to the conductor. The second factor is related to the ability of the resinous material to be dissolved in readily available, inexpensive solvents. Since resinous materials are preferably stored and transported in solution, the bulk and weight of the solvent play a large part in the cost of having the resin at the place where it is to be used at the time it is to be used. In practice, it has been found that it is desirable to employ resinous materials as wire enamels which are capable of being held in solutions which contain at least 30 to 50 percent, by weight, of solids. Since the solvents in the resinous solution are generally allowed to escape without recovery from the wire coating operation, the cost of the solvent is an important factor in the cost of the cured enamel.

The third factor which vitally affects the cost of an enameled wire is the time required to cure the enamel once it has been applied to the conductor. If this time is excessive, an unduly large baking oven is required or the speed of the wire through the oven must be maintained at an uneconomically low rate. The fourth factor which affects the cost of magnet wire is the flexibility of the conditions which may be employed in applying the resin to the conductors and in curing the resin once it has been applied. If the wire speed range in the curing operation, the curing temperature, and the wire diameter sizes are critical, it is obvious that a large amount of defective magnet wire may be prepared under mass production conditions; however, if large variations in curing conditions are tolerable, only a very small amount of the magnet wire prepared need be discarded because of defective insulation.

The fifth factor which is important in the cost of magnet wire is the ability of the same resinous solution to be applied to both round and rectangular conductors and to conductors made of various metals. If different resin solutions must be used for each type of conductor, the time required to change the resin solution is an integral part of the magnet wire cost.

The sixth factor, which is important to the overall production process, as well as to the environment in which the production takes place, is the ecological and pollution factor, and the related safety and toxicity considerations. Organic solvents are becoming increasingly valuable, and production communities are becoming moe concerned about the quality of life and the environment surrounding the manufacturing operation. Thus, it is highly important for a variety of reasons to avoid discharging and wasting organic solvents directly into the atmosphere. A related consideration with respect to the use of organic solvents is therefore the cost of handling and disposal. It has been established that for a typical organic solvent coating operation in a conventional wire tower, more than 90% of the fuel bill is utilized to heat air to dilute evaporated solvent and thereby dilute it to a nonflammable state and to burn the offgases to $CO_2$ and $H_2O$ before they are emitted into the atmosphere.

At the present time, commercially available coating materials for use in electrical applications, such as the coating materials disclosed in U.S. Pat. No. 2,936,296, issued May 10, 1960, to F.M. Precopio and P.W. Fox for "Polyesters From Terephthalic Acid, Ethylene Glycol and a Higher Polyfunctional Alcohol," and used and sold commercially under the trademark "ALKANEX" by General Electric Company, are widely used, highly successful and effective compositions, but have the economic and ecological disadvantage of requiring the use of organic solvents. Where organic solvents are used, they are driven off during curing of the coatings and are generally not economically recoverable. Many such solvents are becoming economically, ecologically and environmentally prohibitive, making it increasingly desirable to utilize substantially water based solvents.

A wide variety of aqueous polyesters coating solutions are known in the art. With few exceptions, however, the coatings produced from such aqueous solutions are not suitable for electrical applications, particularly for wire enamels. Polyester coatings from aqueous solutions cure only very slowly to a tack-free state, exhibit excessive weight loss on curing as compared to organic solvent based resins, and, on aging, become brittle, darken, lose flexibility and generally depolymerize under the conditions of most electrical applications.

Polyamide and polyimide coating materials in aqueous solutions, and coatings produced therefrom, are generally well known in the art, and are highly effective for producing stable electrical grade coatings. See, for example, U.S. Pat. No. 3,652,500, issued Mar. 28, 1972, to M.A. Peterson, for "Process for Producing Polyamide Coating Materials By End Capping"; U.S. Pat. No. 3,663,510, issued May 16, 1972, to M.A. Peterson, for "Process for Producing Polyamide Coating Materials"; U.S. Pat. No. 3,507,765, issued Apr. 21, 1970, to F.F. Holub and M.A. Peterson, for "Method For Electrocoating A Polyamide Acid"; U.S. Pat. No. 3,179,614, issued Apr. 20, 1965, to W.M. Edwards, for "Polyamide Acids, Compositions Thereof, And Process For Their Preparation"; U.S, Pat. No. 3,179,634, issued Apr. 20, 1965, to W.M. Edwards, for "Aromatic Polyimides And The Process for Preparing Them"; and U.S. Pat. No. 3,190,856, issued June 22, 1965, to E. Lavin, et al. for "Polyamides From Benzophenonetetracarboxylic Acids And A Primary Diamine." The prior art involves generally the preparation of a coating medium containing a high molecular weight polyamide acid, and application of the coating medium to a substrate to provide a polyamide acid coating thereon, followed by the curing of the high molecular weight polyamide acid to a polyimide. While such coating materials produce coatings having desirable properties, particularly for electrical applications, they are relatively more expensive than polyester type coating materials.

Aqueous base polyamide acid systems, as described in the above-mentioned patents to Peterson, result in excellent high temperature, electrical grade coatings (250° C., 40,000 hr., insulation coatings), which are stable, and easily made and used, but are relatively expensive when compared to the polyester compositions. It should be noted that the polyester (Alkanex type) magnet wire coating provides a thermal insulation barrier which, though it is less than that of polyimide magnet wire coating, nevertheless is highly suitable for a large segment of the magnet wire needs in the industry, particularly for class B applications, (135° C., 20,000 hr. coatings).

Aqueous based acrylic systems, of the type described in U.S. Pat. No. 2,787,603, issued Apr. 2, 1957, to P.F. Sanders for "Aqueous Coating Compositions and Substrates Coated Therewith," while inexpensive, are not generally suitable for high temperature electrical grade coatings applications such as class B applications. Moreover, such aqueous based acrylic systems are emulsions and not solutions, thereby creating certain stability problems.

Efforts have been made to mix various emulsion polymerized resins to upgrade coatings produced therefrom. For example, properties of coatings and films from polyacrylic polyester resins in aqueous solvents have been somewhat improved by the addition of water soluble phenol-formaldehyde resins, epoxy resins and melamine resins. Such polymer blends, however, are generally not sufficiently upgraded to the classical polyester grade insulations presently utilized in the magnet wire industry.

Because of the high latent heat of vaporization of water, it is desirable in water based systems, particularly for application as wire enamels, to utilize as high a solids content as is possible, commensurate with workable viscosities, when the medium is used with automatic coating apparatus such as wire towers. High molecular weight polymers, such as the polyamide acid polymers which are described in the patents listed above, produce extremely viscous solutions except in relatively low solids content systems. For many applications, the low solids content systems are quite suitable. For wire tower use, however, the low solids content aqueous solution creates production problems which reduces the efficiency of the tower.

Criteria for electrical insulating materials, such as magnet wire insulations, slot insulations, insulating varnishes and the like have been established in the art. In order to determine whether the insulation on a magnet wire will withstand the mechanical, chemical, electrical and thermal stresses encountered in winding machines and electrical apparatus, it is customary to apply the resin to a conductor, by a method which will be described hereinafter, and to subject the enameled wire to a series of tests which have been designed to measure the various properties of the enamel on the wire.

Various tests, which will be described in detail later, include the abrasion resistance tests, the 25 percent elongation plus 3X flexibility test, the snap elongation test, the 70–30 solvent resistance test, the 50–50 solvent resistance test, the dielectric strength tests, the flexibility after heat aging test, the heat shock test, the cut-through temperature test, and the high temperature dielectric strength loss test. The enamel on a conductor which will withstand the mechanical, chemical and electrical stresses encountered in magnet wire applications and which is operable at temperatures of at least 135° C. for extended periods of time must withstand at least 10 strokes with the average of three tests being not less than 20 in the repeated scrape abrasion resistance test, must withstand 980 "grams to fail" in the unidirectional scrape resistance test, must pass the 25 percent elongation plus 3X flexibility test, must show no surface defects in the snap test, must show no attack on the insulation in either of the solvent resistance tests, must have a dielectric strength of at least 1500 v. per mil twisted pair, must show no surface defects when wound on a 3X mandrel after heat aging for 100 hours at 175° C., must show no defects when a 5X coil is aged for 30 minutes at 155° C. in the heat shock test, and must have a cut-through temperature of at least 215° C. under a 1000 gram load for 18 AWG heavy coated insulated magnet wire on copper conductor. In addition, for the same type of magnet wire with Nylon overcoat the insulated conductor must not show a loss in dielectric strength of more than 2/3 of original dielectric strength or a minimum of 1500 volts per mil twisted pair, must show no surface defects when a 3X coil is aged for 30 minutes at 155° C in the heat shock test, and must have a cut-through temperature of at least 200° C under a 1000 gram load.

The abrasion resistance tests, flexibility test, and snap test are employed to determine the mechanical properties of a magnet wire. Abrasion resistance is a measure of the amount of abrasion an insulated electrical conductor will withstand before the insulating enamel is worn away from the conductor. Repeated scrap abrasion resistance is measured by rubbing the side of a loaded round steel needle back and forth across the surface of an insulated electrical conductor until the enamel is worn away. The number of strokes required to wear the enamel away is referred to as the number of abrasion resistance strokes. Unidirectional scrape resistance is measured by rubbing the side of a round steel needle across the surface of an insulated electrical conductor under increasing load until the conductor is exposed. The load required to expose the conductor is referred to as the "grams-to-fail" load. For a complete description of the procedure followed in abrasion resistance testing where a needle is rubbed back and fourth across the insulated electrical conductor, reference is made to NEMA Standard Section MW 24 which describes the procedure followed in the present invention. This NEMA Standard is incorporated by reference into the present application.

The flexibility of the enamel on a magnet wire is determined by stretching the enameled conductor and examining the stretched portion of the wire under a binocular microscope at a magnification of ten to determine if there are any imperfections on the surface of the enamel. The imperfections which may be noted on the surface of the enamel are a series of parallel surface lines of fissures which are perpendicular to the long axis of the wire. This condition of the enamel film is known as crazing. Another defect which can sometimes be observed is a break in the enamel film in which the two sections of the film are actually physically separated and the opening extends in depth to the exposed conductor. This defect is called a crack. A third defect which may be noted is a mar or blemish in the enamel film.

In the 25 percent elongation plus 3X flexibility test an insulated electrical conductor having a diameter X is elongated 25 percent and wound about a mandrel having a diameter 3X. If examination of the enamel under a magnification of ten shows none of the surface defects noted above, the insulation on the conductor passes this flexibility test. In some of the examples which follow, flexibility tests using elongations other than 25 percent and mandrels having a diameter other than 3X are employed. However, in all of these cases the flexibility test is as severe as the 25 percent elongation plus 3X flexibility test.

The snap elongation test measures the ability of the insulation to withstand a sudden stretch to the breaking point of the conductor. The insulation on the conductor must not show any cracks or tubing beyond three test wire diameters on each side of the fracture after the insulated conductor is jerked to the breaking point at the rate of 12 to 16 feet per second.

Solvent resistance tests are conducted to determine whether a magnet wire will satisfactorily withstand the chemical stresses found in electrical applications, i.e., whether the enamel is resistant to the solvents commonly employed in varnishes which may be used as an overcoat for the enameled wires. The solvent resistance test is the determination of the physical appearance of an enameled wire after immersion in a refluxing bath of a specified solution. Two solution systems are used for each sample of wire. Both of these solutions contain a mixture of alcohol and toluene. The alcoholic portion is composed of 100 parts by volume of U.S.P. ethanol and 5 parts by volume of C.P. methanol. One solvent test solution (which is designated as 50-50) consists of equal parts by volume of the above alcohol mixture and of toluene. The second solution (which is designated as 70–30) is 70 parts of the alcohol mixture and 30 parts of toluene.

In the usual operation of the test, about 250 ml. of the solution is placed in a 500 ml. round-bottomed, single-necked flask which is heated by a suitable electrical heating mantle. A reflux condenser is attached to the flask and the solution is maintained at reflux temperature. A sample is formed so that three or more straight lengths of the wire having cut ends can be inserted through the condenser into the boiling solvent. After five minutes the wire is removed and examined for blisters, swelling or softening. Any visible change in the surface constitutes a failure. Soft (requiring the thumbnail to remove it) but smooth and adherent enamel is considered to pass this five minutes test. The samples are then returned to the solvent for another five minutes and re-examined for the same defects. If the enamel shows any blisters or swelling at the end of either the five minutes or the ten minutes test in the 70–30 solution (the 70–30 solvent resistance test) the enamel has failed the solvent resistance test. If the enamel shows any blisters or swelling at the end of the five minutes test in the 50–50 mixture (the 50—50 solvent resistance test) the enamel has failed this solvent resistance test.

The dielectric strength of the enamel film determines whether the insulation on a magnet wire can withstand the electrical stresses encountered in electrical apparatus. The dielectric strength of an insulating film is the voltage required to pass a finite current through the film. In general, dielectric strength is measured by increasing the potential across the insulating film at a rate of 500 volts per second and taking the root mean square of the voltage at which the finite current flows through the film as the dielectric strength.

The type of specimen employed to measure dielectric strength is a sample made up of two pieces of enameled wire which have been twisted together a specified number of times while held under a specific tension. A portential is then placed across the two conductors and the voltage is increased at the rate of 500 volts per second until a finite current flows through the insulation. The voltage determined by this method is referred to as "dielectric strength, volts (or volts per mil), twisted pair." The number of twists and the tension applied to the twisted wire is determined by the size of the bare conductor. A complete listing of the specifications for various wire sizes are described in the aforementioned NEMA Standard Section MW 24.

In order to determine whether a magnet wire may be employed at high temperatures, it is necessary to measure properties of the enameled conductor at high temperatures. Among the properties which must be measured are the cutthrough temperature of the enamel, the flexibility of the enamel after heat aging at an elevated temperature, the heat shock characteristics of the enamel, and the dielectric strength loss of the enamel when heated at high temperatures in air. Since it is well known that copper is the most common conductor, all of the thermal tests of magnet wire are conducted on copper magnet wire.

The cut-through temperature of the enamel film is measured to determine whether the insulation on a magnet wire will flow when the wire is raised to an elevated temperature under compressive stress. The cut-through temperature is the temperature at which the enamel film separating two magnet wires, crossed at 90° and supporting a given load on the upper wire, flows sufficiently to establish electrical contact between the two conductors. Since magnet wires in electrical apparatus may be under compression, it is important that the wires be resistant to softening by high temperature so as to prevent short circuits within the apparatus. The tests are conducted by placing two eight inch lengths of enameled wire perpendicular to each other under a load of 1000 grams at the intersection of the two wires. A potential of 110 volts A.C. is applied to the end of each wire and a circuit which contains a suitable indicator such as a line recorder, a buzzer or neon lamp is established between the ends of the wires. The temperature of the crossed wires and the load is then increased at the rate of 3° per minute until the enamel softens sufficiently so that the bare conductors come into contact with each other and cause the indicator to signal a failure. The temperature at which this circuit is established is measured by a thermocouple extending into a thermowell to a point directly under the crossed wires. The cut-through temperature is taken as the temperature in the thermowell at the moment when the current first flows through the crossed wires. Although this temperature is always somewhat lower than the true temperature of the wires, it gives a fairly accurate measurement of the cut-through temperature range of the enameled wire being tested. Magnet wires designated for operating temperatures of at least 135° C. should have a cut-through temperature of at least 175° C.

When measuring properties of an insulating film such as percent elongation after heat aging, heat shock, weight loss after heating in vacuum, and dielectric strength loss after heating in air, what is actually being measured is the effect of thermal degradation of the enamel on the particular properties being measured. The most straightforward method of measuring this thermal degradation of an enamel on a wire is to maintain the enameled wire at the temperature at which it is desired to operate the wire until decomposition takes place.

However, this method is impractical in the evaluation of new materials because of the relatively long periods of time involved. Thus, it might be found that an enameled wire may operate successfully at a temperature of 135° C., for example, for five to ten years before any substantial thermal degradation takes place. Because it is obviously impractical to wait such a long period of time to find out whether a resin is satisfactory for magnet wire enamel, it is customary to conduct accelerated heat life tests on these enameled wires. Since thermodynamic theories show that the rate of a given reaction can be determined as a function of temperature, it is possible to select elevated temperatures for thermal tests of enamel films and to calculate the thermal properties of the enameled wire at the desired operating temperature from these accelerated test data. Although it might be expected that degradation reactions which occur at elevated test temperatures might not occur at temperatures at which the magnet wire is to be operated because of activation energies required to initiate certain reactions, experience has shown that accelerated heat life tests are an accurate method for determining the heat life of a material at operating temperatures.

In determining whether an enamel film will lose its flexibility after extended periods of time at operating temperature, it is customary to heat age a sample of the enameled wire. In practice it has been found that for a magnet wire to be satisfactory for use in dynamoelectric machines at temperatures of at least 135° C. a sample of the enameled wire having a conductor diameter X must show no surface defects when wound on a mandrel having a diameter of 3X after heat aging for 100 hours in a circulating air oven maintained at a temperature of 175° C.

The effect of high temperatures on the flexibility of a magnet wire enamel may also be measured by winding a sample of the enameled wire having a conductor diameter X on a mandrel having a diameter of 5X, removing the sample of wire from the mandrel and placing it in a circulating air oven maintained at 155° C. After 30 minutes the sample of wire should show no surface defects in any of the windings in order for the enameled wire to have sufficient flexibility for steady operation at least 135° C. This test is known as the heat shock test.

The final thermal requirement of a magnet wire which is to be used at elevated temperatures is that the dielectric strength of the enamel film remains sufficiently high at elevated temperatures after a long period of operation so that no short circuits occur between adjacent magnet wires. We have found that for a magnet wire to be satisfactory for operation at a temperature of at least 135° C. its dielectric strength should not be less than two-thirds of the initial dielectric strength after being maintained at a temperature of 175° C. for 100 hours in an oven circulating air having a relative humidity of 25 percent at room temperature. This change in dielectric strength is measured as the dielectric strength, volts (or volts per mil) twisted pairs, both before and after the 175° C. heat aging.

Objects Of The Invention

It is the principal object of the present invention to produce a coating composition which is highly aqueous in solvent composition, is low in cost, may be utilized in existing commercial coating equipment, and which produces coatings suitable for severe, heavy duty application, particularly electrical uses such as wire enamels and the like.

More specifically, it is the objective of the present invention to provide a resin system finding particular but not exclusive utility in magnet wire enamel formulations, which is commercially competitive with existing magnet wire compositions, which is highly aqueous thereby eliminating organic solvent disposal, toxicity and combustion problems, and which reduces or eliminates pollution problems, and is thus an ecologically and environmentally positive system.

Another object of the present invention is to enable the utilization of water soluble polyester resins for applications such as electrical insulation and magnet wire application, and more particularly to upgrade aqueous polyester resin containing systems to produce electrical grade coatings which are thermally stable and which have improved mechanical and chemical properties.

A further object of the present invention is to provide a stable, economical, highly water soluble resin system suitable for use in a wide variety of coating applications including electrical coating applications such as magnet wire enamels.

Still a further object is to provide a water soluble resin system for coating applications, which resin system produces coatings which on curing, are clear, tough, flexible, dielectric and heat stable.

Another object is to provide a water based coating medium of the foregoing character, which is suitable for use in existing conventional coating equipment, including conventional wire towers for coating continuous filament materials such as magnet wire.

A more detailed object of the present invention is to provide an aqueous based coating medium of the foregoing characteristics from which a resin coating can be applied to a substrate and which when so applied is readily cured to a tack-free state, evidences a minimum weight loss on cure, and does not darken, lose its flexibility or depolymerize on aging.

SUMMARY OF THE INVENTION

In accordance with the foregoing objects, the present invention contemplates a coating composition having a substantially aqueous base and embodying in admixture, a water soluble polyester coating resin and a low molecular weight orthoamic acid diamine produced as the reaction product of an aromatic diamine and an aromatic dianhydride in the molar ratio of $m/(m-1)$ respectively where m has a value of from 2 to about 7. The polyester and orthoamic acid diamine are admixed in the ratio of from 1 to 10 parts polyester and from 1 to 10 parts orthoamic acid diamine. Additional ingredients may be added including accelerators as well as minor amounts of water soluble resins such as phenol-formaldehyde resins, aminoplasts, epoxy resins and the like.

The polyester resins are conventional commercially available water soluble polyester resins conventionally used in coating operations, while the orthoamic acid diamine is produced as the reaction product of an aromatic diamine and an aromatic dianhydride. In the latter process, the diamine is first dissolved in an appropriate solvent and the dianhydride is then slowly added to form an orthoamic acid diamine reaction product in the solvent system. Where the molar ratio of aromatic diamine to aromatic dianhydride is two-to-one, the reaction product is a diamide diacid diamine. To provide an aqueous base diamine system, the reaction product, in the water-miscible organic solvent system, is reacted with a volatile base such as ammonia or primary or secondary amine, to produce a water soluble compound. Water is then added to provide an essentially aqueous based solution which may be mixed with an aqueous solution of a polyester resin.

Upon application of a coating of the solution to a substrate, such as magnet wire, the coating may be cured at a temperature between 100° and 500° C. to drive off the water and solvent and copolymerize the polyester and orthoamic acid diamine. The result is a clear, flexible, tough, adherent, solvent resistant dielectric thermally stable polymeic coating. Unexpectedly, the coating film thus produced exhibits the foregoing properties even when the polyester resin constitutes the major portion of the solids. The resultant coatings exhibit properties comparable to coatings achieved from conventional magnet wire polyester resins applied from organic systems. The aqueous based coating medium of the present invention is stable and neither gells nor coagulates nor forms a precipitate on standing, and has the advantages attributable to an aqueous base system as contrasted to an organic solvent based system insofar as the environment, ecological and pollution factors are concerned. The surprising result is that coatings produced from aqueous polyester resin containing media are upgraded with respect to physical properties comparable to like properties achieved from present commercial coating materials.

Description of the Preferred Embodiment

The coating composition of the present invention is formed by the admixture, in water or a highly aqueous solvent, of a water soluble polyester or polyestermide resin with an aromatic orthoamic acid diamine, particularly an aromatic diamide diacid diamine. Additional water soluble resin materials, such as phenolformaldehyde resins, epoxy resins, and aminoplasts, may be added to the mixture. The water soluble polyesters, polyesterimides, phenol-formaldehyde resins, epoxy resins and aminoplasts are all widely known materials which are readily available in the commercial market. The aromatic orthoamic acid diamine, such as the aromatic diamide-diacid-diamine, is an oligomeric material produced by reacting an aromatic diamine and an aromatic dianhydride in the molar ratio from two-to-one, respectively, to about seven-to-six, respectively, with the former generally in the amount of one mole greater than the latter. Such compounds, containing a one mole excess of the diamine, are low molecular weight, essentially monomeric compounds as distinguished from high molecular weight polymeric compounds, and may be generally expressed by the formula X(YX)$_n$YX where X represents an aromatic diamine, Y represents an aromatic dianhydride, and n has a value of from 0 to 5. Defined another way, the orthoamic acid diamines referred to are the reaction product of m-moles of an aromatic diamine and (m-1) moles of an aromatic dianhydride where m has a value of from 2 to about 7, and a preferred value of from 2 to 5. Aromatic diamide-diacid-diamines and the manner of making and using them as coating materials to produce coatings and coated substrates are described in detail in copending application Ser. No. 475,483, filed June 3, 1974, by Marvin A. Peterson, for Coating Composition and Method of Coating Substrates Therewith, and assigned to the same assignee as the present invention. The higher molecular weight aromatic orthoamic acid diamines produced by reacting the diamine and dianhydride in molar ratios defined above are nevertheless generally characterized as "low molecular weight" monomeric materials and are produced in substantially the same manner as described in application Ser. monomerics 475,483. These monomerics should be distinguished from the polymeric high molecular weight polyorthoamic acids disclosed in U.S. Pat. No. 3,652,500, issued Mar. 28, 1972, to M. A. Peterson for "Process for Producing Polyamide Coating Materials by Endcapping" and U.S. Pat. No. 3,663,510, issued May 16, 1972, to M. A. Peterson for "Process for Producing Polyamide Coating Materials."

All of the above materials are mutually soluble in water or highly aqueous solvents, and are compatible with each other in solution. As the molecular weight of the orthoamic acid diamine increases (n>20), however, the compatibility of the diamine with the other water soluble polymers decreases rapidly, to the end that water soluble polyorthoamic acid polymers, as described in U.S. Pat. No. 3,652,500 and U.S. Pat. No. 3,663,510 are incompatible with other water soluble polymers such as polyesters. Accordingly, it has heretofore proven impossible to prepare a stable, homogeneous coating medium which incorporates both water soluble polyester or polyesterimide resins and water soluble polyorthoamic acid resins.

Polyester Resin

A wide variety of water soluble polyester resins find application in connection with the present invention. It has been ascertained that the base polymers which present the requisite thermal stability for use in connection with the present invention are of the polyester genus, and are generally formed from aromatic anhydrides and acids, such as trimellitic anhydride and acid and phthalic anhydrides and acids. Extensive developments have been made in the field of water soluble polyesters for coatings, and many such materials are in widespread use in the form of pigmented, but otherwise quite clear, highly aqueous solvent systems. While such polyester resins are readily available as commercial products, their exact formulation is most often a proprietary matter with the particular manufacturer. It is possible, however, as demonstrated in the following examples, to formulate and prepare a wide variety of such polyester resins from known materials by following known procedures.

The polyester resins are condensation products of a polycarboxylic acid and a polyhydric alcohol. To achieve the desired thermal stability, the preferred polycarboxylic acid is an aromatic acid or anhydride. The condensation product desirably has an acid number of at least 45, and generally between about 45 and 80. Among the useful polyester resins are the polyesters produced as the reaction product of such aromatic anhydrides and acids as trimellitic anhydride, phthalic acid, phthalic anhydride, terephthalic acid, isophthalic acid, and certain diacid reaction products such as the reaction product of 2 moles of trimellitic anhydride and 1 mole of 4,4'-methylene dianiline, thus:

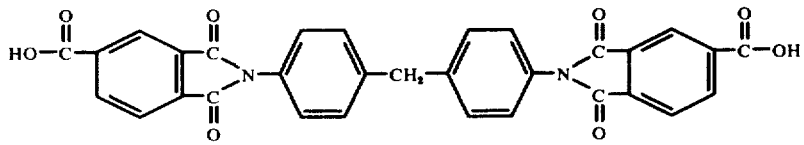

together with such aliphatic diacids as adipic acid; and such polyhydric alcohols as propylene glycol. neopentyl glycol, butylene glycol, diethylene glycol, trishydroxyethylisocyanurate, and the like.

Polyester resins and aqueous solutions thereof useful in this invention are selected from a wide variety of polyester resins which generally produce coating films having good impact resistance and hardness, are flexible and adherent to substrates to which they are applied and can be applied from both organic and aqueous solvent systems. Such polyesters will have an acid number in excess of 45 and generally between 45 and 80 and possibly higher. Below 45 gellation may result. The polyesters are highly stable and maintain their clarity and color over a long period of time.

In the selection of polyester resins for application to magnet wire from aqueous solutions, the use of such materials in commercial wire towers must be considered. Coating resins utilized in such towers must be curable at the wire speed, usually between 40 and 60 feet per minute, and particularly at wire speeds of 50-55 feet per minute, and at the temperatures prevailing in the tower. Among other factors, polyester resins to be applied from aqueous solutions will desirably have a hydroxyl value in the range of from about 100 to about 200 and preferably between about 110 and about 160. Also, such polyester resins, in consideration of electrical applications, will have an aromatic to aliphatic ratio of 22 to 40 molar percent. In admixture with the orthoamic acid diamines hereinafter described, the aqueous coating solutions will desirably have an aromatic to aliphatic molar ratio of from about 25 to about 50 percent. The above criteria can be utilized to select appropriate reactants for producing the polyester resins as well as the admixture of the polyester resins with the orthoamic acid diamines. In this manner coating solutions suitable for application by selected procedures, such as commercial wire towers can be readily formulated.

Appropriate accelerators or catalysts may be added to the polyester resin system. Appropriate catalysts for the polyester resins are certain organometallic compounds such as the titanium chelates. These titanium chelates are commerciall available from E. I. duPont de Nemours and Co. as Tyzor OG tetraoctylene glycol titinate, Tyzor TE triethanolamine titinate, and Tyzor LA ammonium salt of titanium lactate, as well as from other commercial sources. As shown in the examples, the accelerators or catalysts improve the cure of the coating compositions containing polyester resins and the orthoamic acid diamines without adversely affecting the properties of the cured films.

The number and variety of water reducible or soluble polyester resins with the above characteristics and properties is substantially unlimited. While examples are presented showing the preparation and use of a variety of polyester resins, it is not intended to either limit this disclosure or to show how many kinds of polyesters can be prepared. It is rather intended to demonstrate that the present invention involves the surprising and unexpected discovery that, by the admixture of a water soluble polyester resin and a water soluble orthoamic acid diamine, electrical grade, thermally stable coatings may be produced.

Water soluble polyester resins by themselves, generally speaking, do not have the requisite properties for application from aqueous solutions to form electrical grade coatings, particularly wire enamels. Efforts have been made to upgrade water reducible polyester resins by the addition thereto of such known electrical grade water reducible resins as the polyamide acids. These two resins, though both water soluble, have been found to be incompatible, and in admixture result in or separate into both a polyester rich layer and a polyamide acid rich layer.

While other resins, such as phenol-formaldehyde resins, epoxy resins, and the like may be blended in water soluble form, with water soluble polyester resins, the results are less than satisfactory as far as electrical properties ae concerned, although many of the properties of coatings produced from the combined polymers show improvement over the properties achieved from coatings of the individual polymers.

Orthoamic acid diamines

In accordance with the present invention, it has been discovered that certain low molecular weight oligomeric aromatic orthoamic acid diamines, and particularly aromatic diamide-diaciddiamines, are not only fully compatible with aqueous polyester resin solutions, but that coatings produced from such an admixture are clear, tough, flexible and thermally stable, and possess surprisingly good electrical properties, including properties which lend the resin solution to use as a magnet wire enamel in conventional wire coating equipment. The orthoamic acid diamines referred to are low molecular weight compounds, and are distinguished thereby from the known polyorthoamic acid polymers described in U.S. Pat. No. 3,179,614, issued Apr. 20, 1965, to W. M. Edwards for "Polyamide-acids, Compositions Thereof, and Process for Their Preparation," and U.S. Pat. No. 3,652,500 and U.S. Pat. No. 3,663,510 referred to above. The coating material described in U.S. Pat. No. 3,652,500, after endcapping with a diamine, is a long chain, high molecular weight, polyamide acid diamine. Even in the water soluble state, however, such high molecular weight material is incompatible with water solutions of water soluble polyester resins.

As used herein, the term "orthoamic acid diamine" or, alternatively, the term "oligorthoamic acid diamine" is intended to refer to and define low molecular weight compounds produced by the reaction of m-moles of an aromatic diamine with (m-1)-moles of an aromatic dianhydride, where m has a value of between 2 and about 7. Because the orthoamic acid diamines are of relatively low molecular weight and have few repeating "mer" groups, they may for convenience be referred to as "oligomers" as distinguished from "polymers" which conventionally are of high molecular weight with many repeating groups. In this respect, these low molecular weight compounds are clearly distinguishable from the high molecular weight polymers, amine endcapped polyamic acid diamines, disclosed in U.S. Pat. No. 3,652,500, for which the value of m would be in excess of 20. Expressed another way, the orthoamic acid diamines referred to herein have the general formula $X(YX)_n(YX)$ where X represents an aromatic diamine, and Y represents an aromatic dianhydride, and n has a value of from 0 to about 5. The preferred range of values of m is 2 to 4, or the equivalent preferred range of values of n is 0 to 2. Where m is 2 or n is 0, the aromatic orthoamic acid diamine is an aromatic diamide-diacid-diamine. The aromatic diamide-diaciddiamines are described in detail in copending application Ser. No. 475,483, filed June 3, 1974, for "Coating Composition and Method of Coating Substrates Therewith." These compounds are oligomeric materials which are rendered water soluble by the use of ammonia or a volatile amine. These diamide-diacid-diamines may be applied as coatings on a substrate from either an organic or an aqueous solution as a coating medium to form a highly cross-linked polymeric coating on a substrate.

The orthoamic acid diamines useful in this invention are those low molecular weight aromatic compounds produced as the reaction product of an aromatic diamine and an aromatic dianhydride, with the diamine in a one mole excess, as defined above. The initial reaction takes place in an aprotic solvent system which is nonreactive with or inert to the diamine and dianhydride reactants. The reaction is carried out at a temperature below about 70° C. so that there is a negligible level of imidization, resulting in the orthoamic acid product, which may be characterized, where the reactants are to a two-to-one ratio, as a diamide-diacid-diamine. If the reaction solution is heated under controlled conditions, certain desired levels of imidization can be achieved. However, if the heating is carried too far, such as to produce an imide level greater than about 90%, depending upon the particular diamine and dianhydride selected, the imide thus formed precipitates as an insoluble, inflexible, unreactive solid precipitant. Following the formation of the reaction product of the orthoamic acid diamine, such as the diamide diacid diamine, in an organic solvent system, a volatile base is added in an amount sufficient to react with that reaction product to produce a water soluble compound. The system is then diluted with water to provide an esentially aqueous solution.

The initial reaction between the diamine and the dianhydride is carried out in a high solids content organic solvent system, with the reactants in the desired molar ratio, such as the ratio of two-to-one, respectively, that is in the molar ratio of two moles of aromatic diamine to one mole of aromatic dianhydride. To illustrate, a diamine, in the proportion of two moles, is first dissolved in an organic solvent. A dianhydride, in proportion of one mole, is then slowly added or trickled into the diamine solution. The temperature is maintained generally at about 70° C. or below, and preferably at about 50° C. or below. As the dianhydride is trickled into the diamine solution, one mole of the dianhydride immediately reacts with two moles of the diamine to produce the diamide diacid diamine monomeric coating material desired. It has been observed that, if the one mole of dianhydride is dissolved first, and the two moles of diamine is next charged, polymerization occurs resulting in a higher molecular weight polymeric material and an excess of diamine. On the other hand, if dry dianhydride is added rapidly, such as in a chunk or as a slug, the dianhydride reacts faster than it dissolves, thereby leaving "islands" of unreacted dianhydride surrounded by reacted dianhydride.

In order to convert the aromatic orthoamic acid diamine, such as the aromatic diamide diacid diamine reaction product, that is the oligomer or "polymer precursor," to an aqueous based system, a volatile base is added in an amount sufficient to conver the reaction product to a water soluble form, followed by dilution of the system with water to form an aqueous-organic coating medium, without hydrolyzing or destroying the diamide diacid diamine monomer. This reaction is generally initially carried out in the organic solvent at a solids level greater than 40% solids by weights, and more often greater than 50% solids by weight.

The aromatic dianhydrides that are useful in accordance with this invention are those having the general formula:

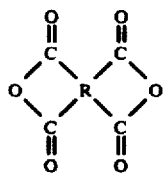

wherein R is a tetravalent radical containing two benzene rings joined by a chemically inert, thermally stable moiety selected from the group consisting of an alkylene chain having from 1 to 3 carbon atoms, an alkyl ester, a sulfone and oxygen, each pair of carboxyl groups being attached to different adjacent carbon atoms of a single separate ring. These dianhydrides include, for example, 4,4'-(2-acetoxy-1,3-glyceryl) bis-anhydro trimellitate,
3,3',4,4'-benzophenonetetracarboxylic dianhydride,
bis(3,4-dicarboxyphenyl) sulfone dianhydride,
bis(2,3-dicarboxyphenyl) methane dianhydride,
2,2-bis (3,4-dicarboxyphenyl) propane dianhydride,
bis(3,4-dicarboxyphenyl) ether dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
and the like.

The aromatic diamines that are useful in accordance with this invention are those having the general formula:

$H_2N-R'-NH_2$ wherein R' is a divalent radical selected from the group consisting of

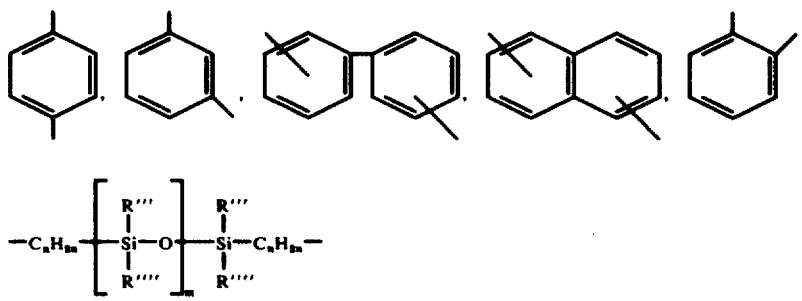

wherein R''' is an aryl and R'''' is an alkyl or an aryl group having 1 to 6 carbon atoms, n is an integer of from 1 to 4 and m has a value of 0, 1 or more and

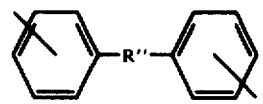

wherein R'' is selected from the group consisting of an alkylene chain having 1-3 carbon atoms,

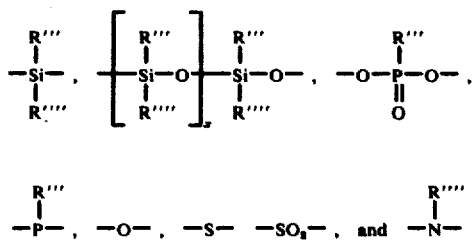

wherein R''' and R'''' are as above-defined and x is an integer of at least 0. In general, the diamines contain between 6 and 16 carbon atoms, in the form of one or two six-membered rings. Such diamines may also be termed or referred to as di-primary amines.

Specific diamines which are suitable for use in the present invention are:
m-phenylene diamine,
p-phenylene diamine,
4,4'-diaminodiphenyl propane,
4,4'-diaminodiphenyl methane, benzidine,
4,4'-diaminodiphenyl sulfide,
4,4'-diaminodiphenyl sulfone,
3,3'-diaminodiphenyl sulfone,
4,4'-diaminodiphenyl ether,
2,6-diaminopyridine,
bis-(4-aminophenyl) diethyl silane,
bis-(4-aminophenyl) phosphine oxide, bis-(4-aminophenyl)-N-methylamine,
1,5-diamino naphthalene,
3,3'-dimethyl-4,4'-diamino-biphenyl,
3,3'-dimethoxy benzidine,
m-xylylene diamine,
p-xylylene diamine,
1,3-bis-gamma-aminopropyltetraphenyl disiloxane,
and mixtures thereof.

The organic solvents utilized in accordance with this invention are those organic solvents having functional groups which do not react with either of the reactants, the aromatic diamines or the aromatic dianhydrides, to any appreciable extent. In addition to being inert with respect to the reactants, the solvent utilized must be inert to and a solvent for the reaction product. In general, the organic solvent is an organic liquid, other than either reactant or homologs of the reactants, which is a solvent for at least one of the reactants, and which contains functional groups other than monofunctional, primary and secondary amino groups and other than the monofunctional dicarboxyl anhydro groups. Such solvents include, for example, N-methyl-2-pyrrolidone (sometimes abbreviated NMP), dimethylsulfoxide (DMSO), N-formyl morpholine (NFM), or such organic solvents as N,N-dimethylmethoxy-acetamide, N-methyl-caprolactam, tetramethylene urea, pyridine, dimethylsulfone, hexamethylphosphoramide, tetramethylenesulfone, formamide, N-methylformamide, N,N-dimethyl formamide, butyrolactone, or N-acetyl-2-pyrrolidone. The solvents can be utilized alone, as mixtures, or in combination with relatively poorer solvents such as benzene, toluene, xylene, dioxane, cyclohexane, or benzonitrile.

The volatile bases that are useful in connection with the present invention for producing a water soluble monomeric reaction product, include ammonia ($NH_3$), ammonium hydroxide ($NH_4OH$), ammonium carbonate [$(NH_4)_2CO_3$] and primary and secondary aliphatic amines containing up to four carbon atoms, such as methylamine, ethylamine, secondary butylamine, isopropylamine, dimethylamine, diethylamine, dibutylamine, and the like.

In the initial reaction for preparing a coating composition embodying the present invention, utilizing an aromatic diamide diacid diamine, an aromatic diamine is reacted with an aromatic dianhydride in the molar ratio of two-to-one respectively, or in other words in the ratio of two moles of the former to one mole of the latter. With reference to the above formula $X(YX-)_n(YX)$, the aromatic diamide diacid diamine is produced when n equals zero, and the molar ratio $m/(m-1)$ holds true when m equals two. The reaction product may be expressed by the general formula:

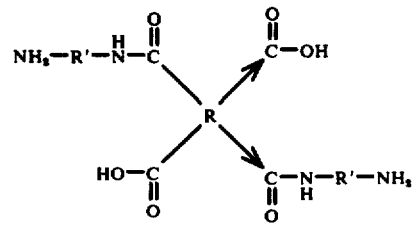

wherein the arrows denote isomerisim, that is where groups may exist in interchanged positions, and R and R' are as defined above. Such an oligomeric reaction product or a "polymer precursor" may be generally characterized as a "diamide-diacid-diamine." Upon additional of a volatile base, a compound having the following general formula results:

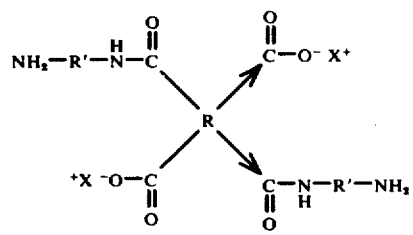

wherein X indicates the positive ion of the volatile base, and R and R' are as defined above. Such compound is water soluble so that the coating composition can be diluted with water to form an aqueous-organic coating medium.

To illustrate the preparation of the diamide-diacid-diamine more specifically, the aromatic diamine, 4,4'-diaminodiphenyl methane, also termed p,p-methylene dianiline (abbreviated MDA or simple M), was mixed with an aromatic dianhydride, 3,3', -4,4'-benzophenonetetracarboxylic dianhydride (abbreviated "BPDA" or simply B), in the molar ratio of two moles of diamine to one mole of dianhydride, in an anhydrous N-methyl-2-pyrrolidone (NMP) solvent at about 50% solids. The reaction was spontaneous at a temperature below 70° C. The resulting product is the oligomer or "polymer precursor" having the formula

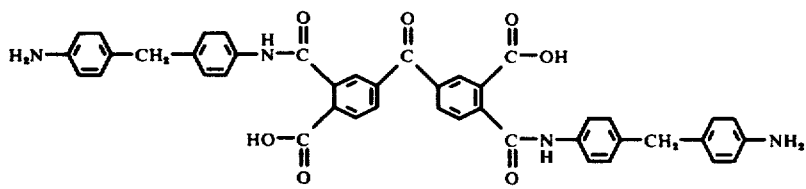

which formula may be conveniently abbreviated as "MBM." For more details on the reaction of the diamine and dianhydride see U.S. Pat. Nos. 3,652,500 and 3,663,510 referred to above.

Similarly, p,p'-methylene dianiline was condensed with 4,4'-(2-acetoxy-1,3-glyceryl)bis-anhydro trimellitate, in the molar ratio of two-to-one, respectively in NMP solvent, at greater than 40% solids and at a temperature generally below 70° C. The resulting oligomer or "polymer precursor" produced has the formula

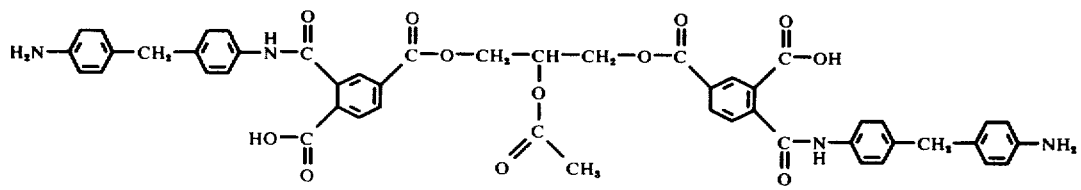

which monomeric compound may be abbreviated as "MAM."

Both the MBM and the MAM oligomeric compounds are insoluble in water, but are made water soluble by the addition of a volatile base such as ammonia or a volatile amine. The result is a water soluble diamide-diaciddiamine oligomer or polymer precursor, which is then combined in admixture with a water soluble polyester resin described above and sufficient water to produce a coating medium having the desired solids content. In a selected application, depending on the polyester selected, coatings produced from the medium thus produced are curable in a predetermined temperature range, usually between 150° C. and 250° C., to produce clear, non-tacky films with excellent adhesion to the substrate.

Oligomeric or "polymer precursor" compounds have been prepared from various combinations of aromatic dianhydrides and aromatic diamines. Among such compounds are those prepared with the following molar ratio: 2.0 moles 1,3-diamino benzene, also termed m-phenylene diamine, and 1.0 mole 3,3',4,4' benzophenonetetracarboxylic dianhydride; 2.0 moles 4,4'-diaminodiphenyl ether, also termed p,p'-oxydianiline, and 1.0 mole of 3,3',4,4'-benzophenone-tetracarboxylic dianhydride; 2.0 moles m-phenylene diamine and 1.0 mole 4,4'-(2-acetoxy-1,3-glyceryl) bis-anhydro trimellitate; 2,0 moles p,p'-oxydianiline and 1.0 mole 4,4'-(2-acetoxy-1,3-glyceryl)bis-anhydro trimellitate. Such compounds were prepared in an N-methyl-2-pyrolidone (NMP) solvent, ammonia or a suitable amine was added, and the solutions diluted with water to a 25% solids by weight solution.

Admixtures of aqueous solutions of polyester resins and aqueous solutions of diamide-diacid-diamines prepared as above-described are prepared by mixing appropriate amounts of each solution to produce the desired ratio of components. Additional water may be added if necessary to produce a coating medium of the desired consistency for the particular coating operation.

While the weight ratio of polyester resin to orthoamic acid diamine, such as the diamide-diacid-diamine, can vary widely, that is from about 9 parts polyester and 1 part orthoamic acid diamine to about 1 part polyester and 9 parts orthoamic acid diamine, the use of relatively small amounts of the orthoamic acid diamine has produced highly satisfactory results. It is believed that even a small amount of the orthoamic acid diamine produces extensive cross-linking in the polyester, leading to coatings having the desired electrical properties.

Upon the heat curing of the admixture of polyester and orthoamic acid diamine it is believed that a highly cross-linked ester-amide-imide structure is formed, resulting in the unique properties achieved. The highly cross-linked structure with the imide linkages is apparently sufficient to enhance the properties of the polymer coating and promote the resulting cured film to an electrical grade material. Surprisingly, even relatively small amounts of the orthoamic acid diamine are sufficient to increase and improve the properties of the coating film over and above properties of films achieved from the polyester resin alone. Moreover, in contrast to attempts to blend aqueous solutions of polyesters with aqueous solutions of polyorthoamic acids, which result in separate phases, the orthoamic acid diamine and polyester blends of the present invention are fully compatible and produce a homogeneous aqueous solution.

Both the polyester and the orthoamic acid diamine are made water soluble by the addition of a volatile base such as ammonia, ammonium carbonate and primary and secondary aliphatic amines. The volatile base may be added either before or after admixing the polyester and orthoamic acid diamine. In other words, an organic polyester solution may be admixed with the organic orthoamic acid diamine solution and then the mixture made water soluble by the addition of a volatile base. Alternatively, the volatile base may be added to each component separately, each component being diluted thereafter with water and the aqueous solutions mixed. In either case, the components are completely compatible with each other. Coatings can then be applied from the combined aqueous solution to whatever substrate may be selected, including copper or aluminum, as well as magnet wire, and the coating cured to produce the desired cured film.

The coating mixture of the polyester and the orthoamic acid diamine may be prepared in yet another way. After preparing the polyester resin and while it is still in the reaction vessel it is diluted with a solvent which is also a solvent for the orthoamic acid diamine. The aromatic diamine reactant as described above is then added to the polyester solution. A solution of the aromatic dianhydride reactant is then added to the polyester and diamine solution and the reaction proceeds in situ. Reactivity of the anhydride is such that it reacts preferentially with the diamine to form the orthoamic acid diamine directly in the polyester solution. Thereafter a volatile base may be added and the solution diluted with water to form the desired aqueous spaced coating medium. The disadvantage of the in situ procedure however insofar as subsequent electrical properties are concerned, is that any reaction of the dianhydride with hydroxyl groups of the polyester leaves residual carboxyl groups in the polymer and in the subsequently cured coating, which may adversely affect electrical properties of the coating. Also, with the in situ preparation it may be difficult to accurately control the formation of the desired orthoamic acid diamine.

It should be further noted that the cured film may be overcoated with a Nylon coating as is conventional practice in the magnet wire industry. It has been observed that the polyesterorthoamic acid diamine cured coating provides a surface which is fully receptive and adherent to the Nylon overcoating.

Polymeric Additives

There may be additionally admixed with the polyester resin minor amounts of a variety of water soluble polymers. Among the illustrative polymers, are water soluble phenolformaldehyde resins, water soluble aminoplasts and water soluble epoxy resins, as well as numerous other materials which are conventionally added to modify the properties of coating materials. A wide variety of the above water soluble resins and other materials are well known and commercially available from a number of sources. For example, water soluble phenol-formaldehyde resins are described in the Kirk-othmer "Encyclopedia of Chemical Technology," Vol. 15, Pages 176–208, 2nd Ed., John Weley and Sons, Inc., 1968, and are commercially available from Union Carbide Corporation. Union Carbide resin BRLA–2854, an amine catalyzed resin, has been added to the polyester -orthoamic acid diamine solution described above in the amount of between about 2% and about 5% by weight. A commercial grade of hexamethoxymethylmelamine, "Aminoplast" resin, such as American Cyanamid Company resin Cymel 301, a water soluble hexamethoxymethylmelamine resin, can be added, and the examples herein illustrate the addition of such a resin to the solution in the amount of between about 2 and about 5% by weight. Such resins are compatible with polyester resins, epoxy resins and many others. See Gams, Widmer and Fisch, Helv. Chem. Acta. 24 302–19E (1941). A water soluble epoxy resin, such as Ciba-Geigy Corporation resin Araldite DP-630 can be utilized to advantage. The examples herein illustrate the use of a water soluble epoxy resin in the polyesterorthoamic acid diamine solution in the amount of between about 2 and about 5% by weight. The addition of the various additives in minor amounts produces homogeneous solutions and the resins are all fully compatible, in the proportions utilized, with the polyester-orthoamic acid diamine solution.

Flow Control Agents

In order to control the flow characteristics of the coating solution, a variety of surfactants, flow control agents and the like may be added to the aqueous polyester orthoamic acid diamine coating solution. Among the wide variety of available flow control agents are the well known surfactants, including fluorocarbon surfactants, carboxypropyl terminated dimethylsiloxane polymer flow agents, nonylphenoxypoly(ethyleneoxy)ethanol, also referred to as nonylphenolethylene oxide adduct, and a mixture off cresylic acid-phenol blend with n-butyl alcohol. The surfactants are generally added in the amount of approximately 100 parts per million although the cresylic acid-phenol blend and n-butyl alcohol will generally be added in amounts substantially greater and up to about 6% by weight of the coating medium.

EXAMPLES

In the following examples, Examples 1 through 13 inclusive describe the preparation of illustrative water solutions of various orthoamic acid diamines useful in this invention; Examples 14 through 22 describe the preparation of illustrative water solutions of polyester resins useful in this invention; Example 23 describes the preparation of a water solution of a high molecular weight polyorthoamic acid diamine following the teachings of the prior art; Examples 24 through 34 demonstrate the general incompatibility of aqueous solutions of a high molecular weight polyorthoamic acid diamine, as prepared according to Example 23, with water solutions of polyesters, such as those prepared according to Examples 14 through 22; and Examples 35 through 75 illustrate the present invention.

EXAMPLE 1

To a reactor equipped with a stirrer, a nitrogen atmosphere, an entry port, and a thermometer well, was charged 132.2 g. N-methyl-2-pyrrolidone having a water content below 200 p.p.m. The solvent was agitated and 132.2 g. (0.667 mole) 4,4'-diaminodiphenyl methane (99% purity) was added over a period of about 30 sec. There resulted a clear solution I. To a second, similar reactor, equipped with a heating mantle, was charged 160.7 g. N-methyl-2-pyrrolidone having a water content below 200 p.p.m. The solvent was agitated and heated to a temperature of 60° C., whereupon with agitation 160.7 g. (0.333 mole) 4,4'-(2-acetoxy-1,3-glyceryl)bisanhydrotrimellitate (99% purity) was added over a period of about 3 min. The temperature rose to about 80° C. Stirring was continued for another 5 min., resulting in a clear homogenous solution II. The solution II was cooled to about 43° C. and allowed to trickle into solution I over a period of about 2 min. with agitation. The temperature rose to a maximum of 75° C. during the next 5 min. period of agitation. There resulted a clear solution III. The percent imidization was found to be 0.7 as determined by titration for the carboxylic acid content in pyridine with tetrabutylammonium hydroxide and with thymol blue as the indicator. The viscosity was 200 cps. at a solids level of 50.0% as the orthoamic acid. Upon exposing 0.50 g. of sample in an aluminum cup having a diameter of about 55 cm. to a temperature of 150° C. for a period of 90 min., the solids level was measured as 47.9%.

The idealized formula of the resin thus produced in solution is:

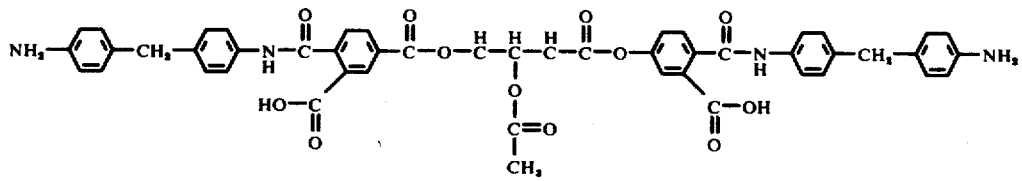

To 585.0 g. of the solution III, there was injected, subsurfacewise and with agitation, 75.0 g. of a 40% aqueous solution of dimethylamine, over a period of 2 min. The resulting solution IV was clear and dilutable with water. With agitation continuing, a mixture of 17.0 g. ethylene glycol n-butyl ether, 5.8 g. N-methyl-2-pyrrolidone, 88.0 g. water, 35.2 g. n-butyl alcohol, and sufficient nonylphenolethylene oxide adduct to result ultimately in 45 p.p.m., was added resulting in a clear solution V having a solids level at 37.5% as the orthoamic acid in solution, and 36.0% as a cured film. The solution V had a viscosity of 185 cps., and a surface tension of 38.7 dynes/cm.

EXAMPLE 2

To another 585 g. of solution III of Example 1, there was injected, subsurfacewise and with agitation 44.7 ml. of 28% ammonia water over a period of 2 min. The resulting solution IV was clear and dilutable with water. With agitation continuing, a mixture of 17.0 g. ethylene glycol n-butyl ether, 5.8 g. N-methyl-2-pyrrolidone, 104.0 g. water, 35.2 g. n-butyl alcohol and sufficient nonylphenolethylene oxide adduct to result ultimately in 45 p.p.m., was added resulting in a clear solution V, having a solids level at 37.6% as the orthoamic acid in solution and 36.0% as a cured film. The solution had a viscosity of 224 cps., surface tension of 39.4 dynes/cm., and a pH of 7.6 at 24° C.

EXAMPLE 3

To the first of the reactors of the type referred to in Example 1 was charged 132.2 g. N-methyl-2pyrrolidone having a water content below 200 p.p.m. The solvent was agitated and 132.2 g. (0.667 mole) of 4,4'-diaminodiphenyl methane (99% purity) was charged with agitation over a period of 30 sec., resulting in a clear solution I. To the second reactor was charged 429.4 g. N-methyl-2-pyrrolidone having a water content below 200 p.p.m. The solvent was agitated and heated to a temperature of 50° C. whereupon 107.3 g. (0.333 mole) of 3,3',4,4'-benzophenonetetracarboxylic dianhydride was charged over a period of 2 min. with agitation. Stirring was continued for another 5 min. and the solution II allowed to cool to 30° C. The solution II of dianhydride was then trickled into solution I with agitation over a period of 3 min. The stirring was continued for a period of 10 min. resulting in a maximum temperature of 55° C. There resulted a clear solution III. The material was titrated for carboxylic acid and the percent imidization found to be less than 1%. Viscosity was 104 cps. at 24° C. at a solids level of 29.9% as the orthoamic acid solution and 28.4% as a cured film, the latter being determined by exposing one gram of sample in an aluminum cup having a diameter of about 5.5 cm. to a temperature of 150° C. for a period of 90 min.

The idealized formula of the resin thus produced in solution is reactor was then charged 21.1 g. of a mixture of 95% n-butyl alcohol and 5% N-methyl-2-pyrrolidone and sufficient amount of nonylphenolethylene oxide adduct such that the resulting total system had about 60 p.p.m. of the latter component. There resulted a clear solution V having a viscosity of 112 cps at 24° C. at a 27.0% solids level as the orthoamic acid and 25.6% as a cured film. The latter was determined by exposing a thin film of the liquid to 150° C. for a period of 90 min. This solution V was water reducible or dilutable.

EXAMPLE 4

To a reactor equipped with a stirrer, nitrogen atmosphere, entry port, and a thermometer well, was charged 108.1 g. N-formyl morpholine having a water content below 200 p.p.m. The solvent was agitated and 108.1 g. (1.000 mole) m-phenylene diamine was charged over a period of about 30 sec. There resulted a clear solution I. To a second, similar reactor equipped with a heating mantle, was charged 161.0 g. N-formyl morpholine having a water content below 200 p.p.m. The solvent was agitated and heated to a temperature of 50° C. whereupon, with agitation, 161.0 g. (0.500 mole) 3,3',4,4'benzophenonetetracarboxylic dianhydride was charged over a period of 3 min. There resulted a temperature rise to 76° C. Stirring was continued for another 5 min. resulting in a clear homogeneous solution II. The solution II was cooled to about 40° C. and allowed to trickle into solution I over a period of about 2 min. with agitation. The temperature rose to a maximum of 73° C. during the next 5 min. period of agitation. The resulting clear solution III had a viscosity of 290 cps. and a solids level of 50.0% as the orthoamic acid.

To 269. 1 g of solution III was injected subsurfacewise and with agitation, a mixture of 100 ml. water and 33.7 ml. of 28% ammonia water over a period of 2 min. The resulting solution IV was clear and dilutable with water. With agitation continued, a mixture of 23.4 g. n-butyl alcohol, 2.2 g. N-formyl morpholine, 100 ml. water and sufficient nonylphenolethylene oxide adduct to provide 60 p.p.m. in the total formulation, was added, resulting in a clear solution V having a solids level of 25.9% as the orthoamic acid and 24.2% as a cured film. The solution had a viscosity of 288 cps., a surface tension of 37.0 dynes/cm., and a pH of 7.4 at 24° C.

EXAMPLE 5

To a reactor equipped with a stirrer, nitrogen atmosphere, entry port and a thermometer well, was charged 200.4 g. N-methyl-2-pyrrolidone. The solvent was agitated, and 200.4 g. (1.000 mole) 4,4'-

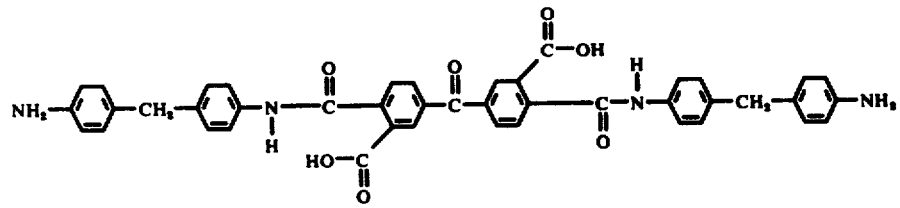

For each 400.0 g. of solution III was added 22.4 ml. 28% aqueous ammoniacal solution, subsurfacewise and with agitation, over a period of 1.5 min. The resulting solution IV was clear and dilutable with water. To the diaminodiphenyl ether was charged over a period of 30 sec. There resulted a clear solution I. To a second, similar reactor equipped with a heating mantle, was charged 161.0 g. M,N-dimethylformamide. The solvent was heated to a temperature of 50° C., whereupon, with agitation, 161.0 g. (0.500 mole) 3,3',4,4'-benzophenonetetracarboxylic dianhydride was charged over a period of about 3 min. There resulted a temperature rise to about 70° C. Stirring was continued for another 5 min. resulting in a clear homogeneous solution II. The solution II was cooled to about 37° C. and allowed to trickle into solution I over a period of about 3 min. with agitation. The temperature rose to a maximum of 68° C. during the next 10 min. period of agitation. The resulting clear solution III had a viscosity of 214 cps. and a solids level of 50.0% as the orthoamic acid. The percent imidization was determined from a titration of the carboxylic acid groups and found to be 1.2%.

To 270.0g. of solution III was injected, subsurfacewise and with agitation, a mixture of 93 ml. water and 18.5 ml. of 28% ammonia water over a period of 2 min. The resulting solution IV was clear and dilutable with water. With agitation continued, a mixture of 23.4 g. n-butyl alcohol 2.2 g. N-methyl-2-pyrrolidone, 100 ml. water, and sufficient nonylphenolethylene oxide adduct to provide 60 p.p.m. in the total formulation, was added, resulting in a clear solution V having a solids level at 25.7% as a cured film. The solution had a viscosity of 233 cps., a surface tension of 37.2 dynes/cm., and a pH of 7.0 at 24° C.

EXAMPLE 6

To a reactor equipped with a stirrer, nitrogen atmosphere, entry port and a thermometer well, was charged 108.1 g. N-methyl-2-pyrrolidone followed by 108.1 g (1.000 mole) m-phenylene diamine, resulting in a clear solution I. To a second, similar reactor equipped with a heating mantle, was charged 241.0 g. N-methyl-2-pyrrolidone. The solvent was heated to 55° C. whereupon with agitation 241.0 g. (0.500 mole) 4,4'-(2-acetoxy-1,3-glyceryl)bis-anhydrotrimellitate was charged over a period of 3 min. and stirring continued for an additional 10 min. period during which the temperature reached a maximum of 68° C. The solution II was cooled to about 30° C. and allowed to trickle into solution I with agitation over a period of 3 min. The temperature peaked at 65° C. during the additional 15 min. period of stirring. The resulting homogeneous solution III in the reactor was allowed to cool to 35° C, whereupon with agitation a mixture of 200 ml. water and 67.0 ml. of 28% ammonia water was injected subsurfacewise over a period of 2.5 min. resulting in a clear solution IV. With agitation continuing a mixture of 50.0 g. n-butyl alcohol, 4.0 g. N-methyl-2-pyrrolidone, 200 ml. water, and sufficient nonylphenolethylene oxide adduct to provide 45 p.p.m., was added. The resulting clear solution V had a solids level of 29.0% as the orthoamic acid in solution and 27.4% as a cured film. The solution had a viscosity of 175 cps., a surface tension of 36.8 dynes/cm., and a pH of 7.1 at 24.5° C.

EXAMPLE 7

To the first of the reactors of the type referred to in Example 4 was charged 132.2 g. N-formyl morpholine having a water content below 200 p.p.m. The solvent was agitated and 132.2 g (0.667 mole) of 4,4'-diaminodiphenyl methane (99% purity) was charged resulting in a clear solution I. To a second similar reactor equipped with a heating mantle was charged 429.4 g. N-formyl morpholine having a water content below 200 p.p.m. The solvent was agitated and heated to a temperature of 58° C. whereupon 107.3 g. (0.333 mole) of 3,3',4,4'-benzophenonetetracarboxylic dianhydride was charged over a period of 4 min. with agitation and the stirring continued for an additional period of 15 min. After cooling to 28° C. the solution II of dianhydride was trickled into the solution I in the first reactor with agitation over a period of 7 min. The stirring was continued for a period of about 15 min. The maximum temperature was 74° C. The resulting clear solution III was titrated for carboxylic acid and the percent imidization found to be 0.6%. The contents of the reactor were allowed to cool to 32° C. To the reactor was added 65.6 g. of a 60% aqueous solution of isopropylamine, subsurfacewise and with agitation over a period of 2.5 min. resulting in a clear solution IV. To the reactor was then charged 42.0 g. of a mixture of 95% n-butyl alcohol and 5% N-formyl morpholine and sufficient nonylphenolethylene oxide adduct such that the resulting solution V was at 50 p.p.m. with respect to the nonionic surfactant. The clear solution had a viscosity of 278 cps. at 25 C. and a solids level of 27.5% as the orthoamic acid and 26.1% as the cured film. The solution was water reducible.

Examples 8 through 10 represents the preparation of a series of resins of the type $M(AM)_xAM$ where $X=1$, $X=3$ and $X=5$, respectively, M represents 4,4'-diaminodiphenyl methane and A represents 4,4'-(2-acetocy-1,3-glyceryl)bis-anhydrotrimellitate. In comparison, Example 1 represents the resin where $X=0$.

EXAMPLE 8

To a reactor equipped with a stirrer, nitrogen atmosphere, entry port, and a thermometer well was charged 124.8 g. N-methyl-2-pyrrolidone having a water content below 200 p.p.m. The solvent was agitated and 24.8 g. (0.125 mole) 4,4'-diaminodiphenyl methane (99% purity) was charged over a period of about 30 sec. There resulted a clear solution I. To the reactor was added a solution a 40.2 g. (0.0832 mole) 4,4'-(2-acetoxy-1,3-glyceryl)bis-anhydrotrimellitate (99% purity) in 40.2 g. N-methyl-2-pyrrolidone over a period of about 2 min. with agitation. Stirring was continued for another 10 min. resulting in a clear homogeneous solution II having a solids level of 28.3% as the orthoamic acid. The percent imidization was found to be 0.4. This provided a molar ratio of $M/A \cong 3/2$ and an average structure of $M(AM)_xAM$ where $X=1$. To the contents of the reactor was added, subsurfacewise and with agitation, 11.4 ml. of 28% ammonia water over a period of 2 min. The resulting solution III was clear and dilutable with water. With agitation continuing, a mixture of 4.3 g. ethylene glycol n-butyl ether, 1.7 g. N-methyl-2-pyrrolidone, 26.0 g. water, 13.2 g. n-butyl alcohol and sufficient nonylphenolethylene oxide adduct to result ultimately in 45 p.p.m. was added resulting in a clear solution IV having a solids level of 22.8% as the orthoamic acid and 21.7% as the cured film (see Example 1). The solution had a viscosity of 32 cps., surface tension of 41.5 dynes/cm. and a pH of 7.2 at 24° C.

EXAMPLE 9

To the reactor of Example 8 was charged 120.7 g. N-methyl-2-pyrrolidone. The solvent was agitated and 20.7 g. (0.104 mole) 4,4'-diaminodiphenyl methane was charged over a period of about 30 sec. There resulted a clear solution I. To the reactor was added a solution of 40.2 g. (0.0832 mole) 4,4'-(2-acetoxy-1,3-glyceryl) bis-anhydrotrimellitate in 40.2 g. N-methyl-2- pyrrolidone, over a period of about 2 min. with agitation. Stirring was continued for another 10 min. resulting in a clear homogeneous solution II having a solids level of 27.4% as the orthoamic acid. The percent imidization was found to be 0.4%. This provided a molar ratio of M/A≅5/4 and an average structure of M(AM)$_x$AM where X=3. To the contents of the reactor was added, subsurfacewise and with agitation, 11.4 ml. of 28% ammonia water over a period of 2 min. The resulting solution III was clear and dilutable with water. With agitation continuing a mixture of 4.3 g. ethylene glycol n-butyl ether, 1.7 g. N-methyl-2-pyrrolidone, 26.0 g. water, 13.2 g. n-butyl alcohol and sufficient nonylphenolethylene oxide adduct to result ultimately in 45 p.p.m. was added resulting in a clear solution IV having a solids level of 22.0% as the orthoamic acid and 21.0% as the cured film. The solution had a viscosity of 30 cps., surface tension of 40.5 dynes/cm. and a pH of 7.0 at 24° C.

EXAMPLE 10

To the reactor of Example 8 was charged 119.3 g. N-methyl-2-pyrrolidone. The solvent was agitated and 19.3 g. (0.0975 mole) 4,4'-diaminodiphenyl methane was charged over a period of about 30 sec. There resulted a clear solution I. To the reactor was added a solution of 40.2 g. (0.0832 mole) 4,4'-(2-acetocy-of glyceryl) bis-anhydrotrimellitate in 40.2 g. N-methyl-2-pyrrolidone, over a period of about 2 min. with agitation. Stirring was continued for another 10 min. resulting in a clear homogeneous solution II having a solids level of 27.2% as the orthoamic acid. The percent imidization was found to be 0.5%. This provided a molar ratio of M/A≅7/6 and an average structure of M(AM)$_x$AM where X=5. To the contents of the reactor was added, subsurfacewise and with agitation, 11.4 ml. pf 28% ammonia water over a period of 2 min. The resulting solution III was clear and dilutable with water. With agitation containing a mixture of 4.3 g. ethylene glycol n-butyl ether, 1.7 g. N-methyl-2-pyrrolidone, 26.0 g. water, 13.2 g. n-butyl alcohol and sufficient nonylphenolethylene oxide adduct to result ultimately in 45 p.p.m., was added resulting in a clear solution IV having a solids level of 22.8% as the orthoamic acid and 21.7% as the cured film. The solution had a viscosity of 30 cps., surface tension of 40.7 dynes/cm. and a pH of 7.0 at 24° C.

Examples 11 through 13 represent the preparation of a series of resins of the type M(BM)$_x$BM where X=1, X=3 and X=5, respectively, M represents 4,4'-diaminodiphenyl methane and B represents 3,3', 4,4'-benzophenonetetracarboxylic dianhydride. In comparison, Example 3 represents this resin where X=0 and Example 23 below where X is in excess of 20.

EXAMPLE 11

To the reactor of Example 8 was charged 100.0 g. of a 50.0% by weight solution of 4,4'-diaminodiphenyl methane (0.242 mole) in N-methyl-2-pyrrolidone resulting in solution I. To the reactor was added, slowly, over a period of about 2 min. with agitation, 471.0 g. of a 11.5% by weight solution of 3,3',4,4'-benzophenonetetracarboxylic dianhydride (0.168 mole) in N-methyl-2-pyrrolidone. Stirring was continued for another 10 min., resulting in a clear homogeneous solution II having a solids level of 18.2% as the orthoamic acid. The percent imidization was found to be 0.3%. This provided a molar ratio of M/B≅3/2 and an average structure of M(BM)$_x$BM where X=1. To the contents of the reactor was added, subsurfacewise and with agitation, 23.1 ml. of 28% ammonia water over a period of 2 min. The resulting solution III was clear and dilutable with water and at a solids level of 17.6% as the orthamic acid and 16.6% as the cured film. The solution had a viscosity of 40 cps., surface tension of 45.1 dynes/cm. and a pH of 8.2 at 24° C.

EXAMPLE 12

To a reactor of Example 8 was charged 100.0 g. of a 50.0% by weight solution of 4,4'-diaminodiphenyl methane (0.252 mole) in N-methyl-2-pyrrolidone resulting in solution I. To the reactor was added, slowly, over a period of about 2 min. with agitation 565.3 g. of a 11.5% by weight solution of 3,3',4,4'-benzophenonetetracarboxylic dianhydride (0.202 mole) in N-methyl-2-pyrrolidone. Stirring was continued for another 10 min. resulting in a clear homogeneous solution II having a solids level of 17.3% as the orthoamic acid. The percent imidization was found to be 0.5%. This provided a molar ratio of M/B≅5/4 and an average structure of M(BM)$_x$BM where X=3. To the contents of the reactor was added, subsurfacewise and with agitation, 27.7 ml. 28% ammonia water over a period of 2 min. The resulting solution III was clear and dilutable with water and at a solids level of 16.7% as the orthoamic acid and 15.6% as the cured film. The solution had a viscosity of 46 cps., surface tension of 44.4 dynes/cm. and a pH of 8.0 at 24° C.

EXAMPLE 13

To the reactor of Example 8 was charged 100.0 g. of a 50.0% by weight solution of 4,4'-diaminodiphenyl methane (0.252 mole) in N-methyl-2-pyrrolidone resulting in solution I. To the reactor was added, slowly, over a period of about 2 min. with agitation 605.6 g. of a 11.5% by weight solution of 3,3',4,4'-benzophenonetetracarboxylic dianhydride (0.216 mole) in N-methyl-2-pyrrolidone. Stirring was continued for another 10 min. resulting in a clear homogeneous solution II having a solids level of 16.9% as the orthoamic acid. The percent imidization was found to be 0.4%. This provided a molar ratio of M/B≅7/6 and an average structure of M(BM)$_x$BM where X=5. To the contents of the reactor was added, subsurfacewise and with agitation, 29.7 ml. 28% ammonia water over a period of 2 min. The resulting solution III was clear and dilutable with water and at a solids level of 16.3% as the orthoamic acid and 15.2% as the cured film. The solution had a viscosity of 40 cps., surface tension of 44.5 dynes/cm., and a pH of 8.0 at 24° C.

EXAMPLE 14

To a reactor equipped with heating mantel, nitrogen sparge, stirrer and thermometer, was charged 225.0 g. (2.160 mole) neopentyl glycol. The heat was turned on and at about 100° C. after the neopentyl glycol was liquified, 185.0 g. (0.963 mole) of trimelletic anhydride was added over a period of about 3 min. The mixture was held at 100° C. for about 10 min. whereupon the mixture was clear. The temperature was raised to 170° C., and 95.0 g. (0.650 mole) of adipic acid was added. The reactor was held at this temperature with read-outs of the acid number every hour. After about 5 hrs. at this temperature, an acid number of 56 was obtained. The acid number was determined in acetone rather than the conventional benzene-ethanol solution since this resin is insoluble in the latter. To this resin system was added 8.3% dimethylethanol amine made up as a solution in water/t-butyl alcohol = 85/15, such that the resin solids level was 33.6%. There resulted a slightly hazy solution having a pH of 7.4 and a viscosity of 8700 cps at 25° C. The polymer in this form was water reducible. The idealized structure for this polymer before the amine addition is as follows:

letic anhydride; and 60.0 g. (0.410 mole) adipic acid. Using a similar set of reaction conditions, there resulted after a process time of 6 hrs. at 172° C., an acid number of 55. The polymer was treated with an aqueous solution of dimethylethanol amine in the same manner as in Example 15, resulting in a slightly hazy, water reducible, solution having a viscosity of 9000 cps at 25° C. at 33.9% solids and a pH of 7.4. The idealized structure is similar to that shown in Example 15 with R

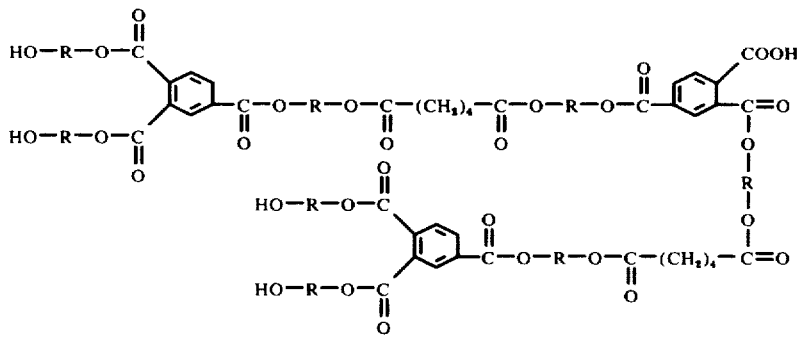

When R represents neopentyl glycol.

EXAMPLE 15

To a reactor equipped with a heating mantel, nitrogen sparge, stirrer and thermometer, was charged 245.0 g. (3.219 moles) propylene glycol followed by 255.0 g. (1.327 moles) trimelletic anhydride and 65.0 g. (0.445 mole) adipic acid. The temperature was raised to 172° C. and held at this temperature until the acid number dropped to about 56, which occurred in about 6 hrs. Since this resin was insoluble in the conventional benzene-ethanol solvent, the acid number was determined in acetone.

The resin system was cooled and trickled into an agitating solution of about 8.3% dimethylethanol amine in water such that the resulting solution was at a solids level of 34.2% and a pH of 7.6. There resulted a slightly hazy solution with a viscosity of 9400 cps. at 25° C. The polymer in this form was water reducible. The idealized structure of this polymer, before the amine addition, is as follows:

representing butylene glycol.

EXAMPLE 17

Using the reactor referred to in Example 15, the following charge was employed: 275.0 g. (2.640 moles) neopentyl glycol was charged and heated to 172° C.; with agitation, 217.5 g. (1.132 moles) trimelletic anhydride was added and the temperature held for 12 min., resulting in a clear solution; with temperature held at 171° C.; 55.0 g. (0.376 mole) adipic acid was added. The contents of the reactor were held for about 6 hrs. at 172° C. until an acid number of 55 was obtained. The polymer solution was cooled and treated with an aqueous solution of ammonia such that the resulting 34.2% solids solution had a pH of 7.4. The water reducible system had a viscosity of 8100 cps. at 25° C. The idealized structure is similar to that shown in Example 15 with R representing neopentyl glycol.

EXAMPLE 18

To a reactor equipped with heating mantel, nitrogen

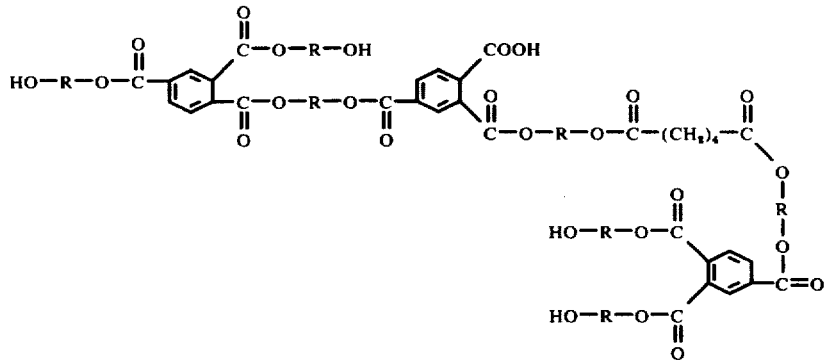

Where R represents propylene glycol.

EXAMPLE 16

Using the reactor referred to in Example 15, the following charge was employed: 255.0 g. (2.829 moles) butylene glycol (1-3); 232.5 g. (1.210 moles) trimelsparge, stirrer and thermometer, was charged 166.1 g. (1.000 mole) of terephthalic acid followed by 96.0 g. (0.500 mole) trimelletic anhydride and 318.4 g. (3.000 moles) of diethylene glycol. The temperature was increased to 200° C. and maintained for about 2½ hrs. There resulted a clear solution. An additional 96.0 g.

(0.500 mole) of trimelletic anhydride was then added to the hot solution with heating and agitation maintained until an acid number of about 50 was attained. The 100% solids system was treated at about 60°–80° C., with warm water containing sufficient methyldiethanolamine to result in a 34% solids solution having a pH of 7.2, and a viscosity of 1315 cps. at 25° C. The resulting polymer solution was water reducible and was observed to be stable for time periods in excess of three months.

EXAMPLE 19

To the reactor described in Example 18 there was charged 384.2 g. (2.000 moles) of trimelletic anhydride (TMA) and 319.4 g. (3.000 moles) of diethylene glycol. The temperature was increased to 195° C. and maintained for about 3½ hrs., resulting in a clear solution of fused polymer having an acid number of about 53. After treatment with methyldiethanol amine and water to 34% solids, the polymer solution was slightly hazy, had a pH of 7.4 and a viscosity of 70 cps. at 25° C. The resulting polymer solution was water reducible and stable for time periods in excess of three months.

EXAMPLE 20

To a reactor equipped with heating mantel, nitrogen sparge, stirrer and thermometer, was charged 222.8 g. (2.140 moles) neopentyl glycol. The temperature was raised to 173° C. To the fused glycol, under nitrogen, with stirring and with the temperature controlled at 173° C., was added 130.6 g. (0.500 mole) tris(2-hydroxyethyl) isocyanurate. To the reactor then was charged 217.5 g. (1.132 moles) trimellitic anhydride and the temperature held for about 15 min., resulting in a clear solution to which was added 55.0 g. (0.376 mole) adipic acid. The contents of the reactor were held at 173° C. for about 6.5 hrs. until an acid number of 58 was obtained. The polymer solution was then treated with an aqueous solution of dimethylethanol amine. The resulting slightly hazy water reducible solution had a solids level of 34.5%, a pH of 7.8 and a viscosity of 5900 cps. at 25° C.

EXAMPLE 21

To a reactor equipped with a heating mantel, nitrogen sparge, stirrer and thermometer, was charged 245.0 g. (3.219 moles) propylene glycol, followed by 255.0 g. (1.327 moles) trimellitic anhydride, and 73.9 g. (0.445 mole) isophthalic acid. The temperature was raised to 170° C. and held for a total of about 6.5 hrs. resulting in a clear resin having an acid number of 62, forming polyester system 1. The resin system I was cooled and trickled into an agitating solution of about 8.3% dimethylethanol amine in water, so that the resulting solution was at a solids level of 33.6% and a pH of 7.8. The slightly hazy solution had a viscosity of 3700 cps. at 25° C. The polymer in this form was water reducible. The idealized structure of this polymer is about as shown in Example 15, differing in that the aliphatic-(CH₂)₄ group would be replaced by the aromatic-(C₆H₄)-group.

EXAMPLE 22

The synthesis of Example 21 was repeated except that instead of using 0.445 mole of isophthalic acid, there was added a mixture of 43.8 g. (0.300 mole) of isophthalic acid and 84.4 g. (0.145 mole) of the reaction product of 2 moles of trimelletic anhydride and one mole of 4,4'-methylene dianiline having the structure

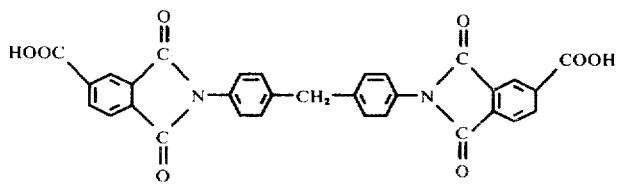

and a calculated molecular weight of 582.4. The temperature was raised to 174° C. and held for about 7.5 hrs., resulting in a polymer having an acid number of 66. The resin system was cooled and trickled into an agitating solution of about 8.3% dimethylethanol amine in water so that the resulting solution had a solids level of 34.2% and a pH of 7.4. The slightly hazy solution had a viscosity of 7400 cps at 25° C. The polymer in this form was water reducible.

It is very evident that the number of useful water reducible polyesters is substantially unlimited. It is not the purpose of this presentation to show how many kinds of polyesters can be made, but to show the unexpected finding that an imide forming orthoamic acid amine has been identified that is fully compatible with water soluble polyesters. High molecular weight polyamides are well established and are also well known to be costly. The combination of water soluble high molecular weight polyamide acids with water soluble polyesters was futile as is evidenced in Example 23. However, the combination with an orthoamic acid diamine prepared according to Examples 1 –13 was unexpectedly found to result in compatible solutions and thermally very stable cured resin systems, which had surprisingly good electrical properties.

EXAMPLE 23

A Regal mixer equipped with cooling to the jacket was flushed with dry nitrogen, dewpoint −65° C. and charged with 3760 g. of dry N-methyl-2-pyrrolidone (<0.01% water), followed by 360 g. (1.818 moles) p,p'-methylene dianiline, (>99.7% purity). After stirring for about one minute, 293 g. (0.909 mole) 3,3',4-,4'-benzophenonetetracarboxylic dianhydride, (>99.5% purity), was added with stirring over a period of 5 minutes and the stirring continued for 15 minutes. The maximum temperature during this period was 35° C. The temperature was reduced to 25° C. and 299 g. (0.927 mole) of 3,3',4,4'-benzophenonetetracarboxylic dianhydride was added dropwise over a period of 15 min. with agitation and with the exotherm temperature rise controlled at a max. of 40° C. The resulting polyorthoamic acid solution was clear and had a solids content of 20.2%. The carboxylic acid content was determined by titration with t-butylammonium hydroxide in pyridine to a thymol blue end point and the percent imidization calculated to be 0.6±0.5%, or essentially a negligible amount. The inherent viscosity was determined in N-methyl-2-pyrrolidone at 37.8° C. and found to be 0.60 dl./g. at C = 0.500 g./dl. The kinematic viscosity of the system was 2400 cps at 40° C.

To the reactor was added, continuously, dropwise, and with agitation, over a period of 15 min., a solution of 3.6 g. (0.018 mole) of p,p'-methylene dianiline in 100 g. of N-methyl-2-pyrrolidone and the mixing continued under nitrogen and with cooling and with the temperature mained at about 40° C. After an additional 45 min. of mixing the kinematic viscosity was found to be 4700 cps at 40° C., and the inherent viscosity was 0.82 dl./g. After formation of the polymer, 200 g. of conc. ammonium hydroxide was added to the Regal mixer with mixing. This was followed by addition of 600 g. of distilled water and the system stirred for about 30 min., resulting in a clear, aqueous based, polymer solution. The polymer system was treated with a flow control agent by adding 0.6% by total system weight of a conventional nonionic, nonylphenolethylene oxide adduct. The resulting product was a clear solution having a solids content of 17.2% and a viscosity of 480 cps at 23.8° C. The solution was employed to coat copper wire in a conventional wire enameling tower. The resulting 3.0 mil. build coating was found to pass 25% elongation and IX flexibility.

EXAMPLE 24

To a reactor, equipped with a stirrer, was charged 120.0 g. of the polyester as prepared in Example 14 at 33.6% solids. Over a period of 2.0 min., 30.0 g. of the aqueous 17.2% solids polyorthoamic acid polymer solution prepared in Example 23 was added to the contents of the reactor. The stirrer was operated for an additional period of 15 min. This resulted in a polyester to polyorthoamic acid polymer resin ratio of about 9/1. Upon standing, a phase separation occurred, resulting in a polyorthoamic acid polymer rich layer at the top and a polyester rich layer at the bottom, indicating incompatibility of the polymer blend.

EXAMPLE 25-32

In a manner similar to that in Example 24 a series of polymer solution blends were attempted using 120.0 g. of each of the polyesters prepared in Examples 15–22 with 30.0 g. of the aqueous 17.2 solids polyorthoamic acid polymer solutions prepared in Example 23 as follows:

| | |
|---|---|
| Example 25 | 120.0 g. polyester of Example 15 + 30.0 g. polymer solution of Example 23 |
| Example 26 | 120.0 g. polyester of Example 16 + 30.0 g. polymer solution of Example 23. |
| Example 27 | 120.0 g. polyester of Example 17 + 30.0 g. polymer solution of Example 23. |
| Example 28 | 120.0 g. polyester of Example 18 + 30.0 g. polymer solution of Example 23. |
| Example 29 | 120.0 g. polyester of Example 19 + 30.0 g. polymer solution of Example 23. |
| Example 30 | 120.0 g. polyester of Example 20 + 30.0 g. polymer solution of Example 23. |
| Example 31 | 120.0 g. polyester of Example 21 + 30.0 g. polymer solution of Example 23. |
| Example 32 | 120.0 g. polyester of Example 22 + 30.0 g. polymer solution of Example 23. |

In each instance the polyester rejected the polyorthoamic acid polymer, resulting, in each instance, in a phase separation with formation of a polyorthoamic acid polymer rich layer and a polyester rich layer.

EXAMPLE 33

To a reactor, equipped with a stirrer, was charged 90.0 g. of an aqueous 33.6% solids solution of a polyester as prepared in Example 21. Over a period of 2.0 min., 60.0 g. of an aqueous polyorthoamic acid polymer solution as prepared in Example 23, at 17.2% solids, was added to the contents of the reactor. The stirrer was operated for an additional period of 15 min. This resulted in a polyester to polyorthoamic acid polymer resin ratio of about 75/25. On standing, a phase separation occurred, resulting in a polyorthoamic acid polymer rich layer at the top and a polyester rich layer at the bottom, indicating incompatibility of the polymer blend.

EXAMPLE 34

To a reactor, equipped with a stirrer, was charged 135.0 g. of the 33.6% solids polyester solution as prepared in Example 21. Over a period of 2.0 min., 15.0 g. of the polyorthoamic acid polymer solution as prepared in Example 23, at 17.2% solids, was added to the contents of the reactor. The stirrer was operated for an additional period of 15 min. This resulted in a polyester to polyorthoamic acid polymer resin ratio of about 95/5. On standing, a phase separation occurred, resulting in polyester and a polyorthoamic acid polymer resin rich regions, indicating the tolerance of the polyester polymer for polyorthoamic acid polymer is apparently well below 5%.

EXAMPLE 35

To a reactor equipped with a stirrer was charged 180.0 g. of an aqueous solution of a polyester at 33.6% solids prepared according to Example 21 followed by 18.8 g. of the aqueous solution of the orthoamic acid prepared by the procedure described in Example 1 at 36.0% solids (as the cured film). Stirring was continued for a period of 15 min. The resin cured weight ratio of polyester to orthoamic acid diamine was at about 9 to 1. In sharp contrast to the result obtained in Example 24, there resulted a clear solution with no evidence of phase separation. To the reactor, with agitation, was added 10.0 g. of a mixture of 9.5 g. n-butyl alcohol and 0.5 g. N-methyl-2pyrrolidone containing a sufficient amount of nonylphenolethylene oxide adduct such that the resulting system had about 60 p.p.m. of the latter component. The resulting clear aqueous solution of the polymer blend had a solids level of 32.2%, a surface tension of 36.5 dynes/cm., a pH of 7.5 and a viscosity of 347 cps. at 24° C. The solvent in this system is in excess of 80% water. About 0.5 g. of the solution was placed in an aluminum dish about 5.5 cm. in diameter. The solution flowed out evenly. The sample was placed in a forced-air oven set at 150° C. for 15 min. and then removed and examined. It was found to be a homogeneous clear film free of any phase separation. The cure was continued for 90 min. at 220° C. followed by 20 min. at 250° C. There resulted a clear, tough 0.3–1.0 mil film exhibiting excellent adhesion to and flexibility on the aluminum substrate. Another portion of the solution was placed on a copper substrate and another on an iron substrate and a doctor blade employed to draw uniform wet films. A similar cure schedule was employed and the resulting 0.2–0.5 mil films were found to be clear, tough, and exhibiting excellent adhesion to the substrates as evidenced by no separation at the interface following considerable flexing.

The 32.2% solids solution was employed to coat 18 AWG wires, 0.0403 inch copper and aluminum wire, using a conventional set of six wire enamel metering dies, namely, 0.043, 0.044, 0.044, 0.045, 0.045, and 0.046 inch diameter opening. Each of the wet drawn enamel films was cured with the aid of forced-air ovens before the next layer of wet film was applied. The resulting films were smooth and concentric. The film build was 2.8 to 3.0 mil on the diameter. A description of the mechanical, chemical, electrical and thermal test methods have been presented above. The mechanical properties of the film included: flexibility of 25% and 1X on copper and 15 % and 1X on aluminium; repeated scrape 15-25 strokes; unidirectional scrape resistance 1020 g.; passed snap elongation. The chemical properties of the film included: pass of 70/30 and 50/50 solvent resistance test. The electrical properties of the film included: strength in excess of 2000 v./mil in twisted pair test. The thermal properties of the film included: cut-through temperature (see table below); 155° C. heat shock passed at 2X-3X; 175° C. heat aging passed 3X.

The above coated six pass wire was overcoated with a conventional Nylon wire enamel, namely, a solution of 15% 6,6-Nylon dissolved in a 70/30 cresylic acid/hydrocarbon solvent. This was accomplished with an 0.047 inch diameter opening for the seventh pass. The wet drawn Nylon film was cured with the aid of forced-air ovens. The resulting film composite was smooth. A slight improvement was found in the heat shock test, namely 1X-2X; the other properties cited above were found to be essentially unchanged.

EXAMPLES 36–42

To a series of polymer blend solutions prepared by the procedure described in Example 35, at 32.2% solids by weight, was added organometallic compounds known to be accelerators utilized in the curing of certain polyesters. The catalysts employed and their concentrations are as follows (in each instance the percent values are expressed as percent organometallic by weight of the resin solids):

| Example 36. | 0.5% Tetraoctylene glycol titanate (Tyzor OG) |
| Example 37. | 1.0% Tetraoctylene glycol titanate (Tyzor OG) |
| Example 38. | 0.5% Triethanolamine titanate (Tyzor TE) |
| Example 39. | 1.0% Triethanolamine titanate (Tyzor TE) |
| Example 40. | 2.0% Triethanolamine titanate (Tyzor TE) |
| Example 41. | 0.5% Ammonium salt of titanium lactate (Tyzor LA) |
| Example 42. | 2.0% Ammonium salt of titanium lactate (Tyzor LA) |

These titanium chelates are commercially available from E. I. duPont deNemours and Co. as follows: Tyzor OG at 100% solids; Tyzor TE as 80% solids in isopropanol; Tyzor LA as 50% solids in water. In each instance the accelerator was compatible, forming stable, clear solutions with the Example 35 polymer blend solution. In order to evaluate the effect of acceleration on the cure, a cut-through test was performed on films cured out employing a standard cure schedule. The cut-through test involved formation of a 3.0 mil film on an aluminum substrate which was then shaped over an insulated copper wire and over which was then crossed a bare copper wire, perpendicular to the coated substrate. A 1000 g. weight was placed at the cross point and the unit placed in a forced-air oven. The oven was equipped with thermocouples and a rate of temperature rise of 3°/min. With the aid of a multipoint recorder the cut-through temperature was automatically recorded as that point when the cured film was cut through and offered no resistance to flow of current. The cured film in each case was prepared by weighing 0.8 g. into a 5.5 cm. diameter aluminum dish and then subjected to a cure schedule of 15 min. at 150° C., 90 min. at 220° C. and 5 min at 255° C. There resulted clear, tough films exhibiting excellent adhesion to aluminum. The results of the cut-through test are presented in the following table:

| Sample | Catalyst | Cut-through |
|---|---|---|
| Example 36 | Tyzor OG - 0.5% | 204 |
| Example 37 | Tyzor OG - 1.0% | 220 |
| Example 38 | Tyzor TE - 0.5% | 224 |
| Example 39 | Tyzor TE - 1.0% | 253 |
| Example 40 | Tyzor TE - 2.0% | 270+ |
| Example 41 | Tyzor LA - 0.5% | 222 |
| Example 42 | Tyzor LA - 2.0% | 270+ |
| Example 35 | No catalyst | 184 (258*) |

*A cut-through of 258 was achieved when the time at 255° C. in the cure schedule was extended from 5 min. to 50 min.

The 32.2% solids solution of Example 39 containing 1.0% triethanolamine titanate (Tyzor TE) by resin weight, was employed to coat 18 AWG wire, 0.0403 inch copper and aluminum wire using a conventional set of six wire enamel metering dies and forced-air ovens to cure as described in Example 35. The resulting films were found to be smooth and concentric with a 2.8 to 3.0 mil film build on the diameter. The properties of the film included: 25% and 1X flexibility on copper; 15% and 1X flexibility on aluminum; repeated scrape 18-28 strokes; chemical resistance to 70/30 and 50/50 solvent test; dielectric strength in excess of 2000 v./mil; 2X-3X heat shock at 155° C.; 3X in the 175° C. heat aging.

From the above results of Examples 36 through 42, as compared to the results of Example 35, it was apparent that the titanium chelate accelerators offer desirable acceleration of the cure of coatings applied from the polyester orthoamic acid diamine aqueous solution blends, without degradation of the film properties, and with an increase in cut-through temperature.

EXAMPLE 43

To a reactor equipped with a heating mantle and a stirrer and containing 60.5 g. of the polyester resin system I of Example 21 at 60° C., was trickled in over a period of 5 min. 14.1 g. of the orthoamic acid diamine solution III of Example 1, at 50% solids at the orthoamic acid in N-methyl-2-pyrrolidone, with the reactor temperature controlled at 60° C. and with agitation. The temperature was held at 50° C. with agitation continuing for an additional period of 10 min. There resulted a clear polymer blend solution at a solids level of 90% by weight in N-methyl-2-pyrrolidone (I). To the reactor was then added with agitation, continuously over a period of 3 min. a mixtutre of 9.92 g. dimethylethanol amine, 0.72 g. dimethyl amine, 111.7 g. water, 0.7 g. N-methyl-2-pyrrolidone, 10.9 g. n-butyl alcohol, 0.41 g. ethylene glycol n-butyl ether and sufficient nonylphenolethylene oxide adduct such that the resulting system had about 60 p.p.m. of the latter component. There resulted a clear solution with no evidence of phase separation. The solution properties of this polymer blend were as follows: Solids level, 32.1%; surface tension, 36.7 dynes/cm.; pH, 7.6; viscosity 387 cps. at 24° C. The solvent system is in excess of 80% water. These solution properties are not unlike those found for Example 35. The clarity, toughness, flexibility, and adhesion properties for films formed in a manner identical with the procedures cited in Example 35 were essentially like those found for the alternative polymer blend method of preparation illustrated in Example 35. In essence a similar result can be obtained independent of whether the polymer blending operation is performed before or after the conversion of the separate polymers to water soluble polyelectrolytes. Additional studies indicate that the normal heat-bodying of a resin-solvent system to provide a preferred solids-viscosity relationship is best conducted on the resin blend before the resins have been converted to the water soluble polyelectrolyte form.

EXAMPLE 44

To a polymer blend solution prepared as described in Example 43, at a solids level of 32.1%, was added 1.0% triethanolamine titanate by weight of resin solids. There resulted a clear stable solution of about 32.1% solids, with solution properties similar to those cited in Example 43. About 0.8 g. of the solution was placed in an aluminum dish 5.5 cm. in diameter. The sample flowed out evenly and was cured using a stepwise cure of 15 min. at 150° C., 90 min. at 220° C., and 5 min. at 255° C. There resulted a clear, flexible, tough film exhibiting excellent adhesion to aluminum. A strip of coated aluminum containing 3.0 mil of the so-cured film was tested versus a similarly prepared film of Example 43 in the cut-through apparatus described in Examples 36–42 and found to have a cut-through of 256° C. as compared to a cut-through of 187° C. observed in Example 43. This example illustrates, as was found in Examples 36–42, that titanium chelates offer a desirable acceleration of the cure of the polyester-orthoamide acid diamine aqueous solution blend.

EXAMPLE 45

To 74.6 g. of the polymer blend solution prepared according to Example 43 solution I, at about 90% solids by weight, in N-methyl-2-pyrrolidone, was added 1% triethanolamine titanium chelate by weight of resin solids with the polymer blend solution of about 55° C. with agitation and with agitation continuing for about 10 min. after the addition. To the reactor was then added, with agitation, continuously over a period of 3 min., a mixture of 9.92 g. dimethylethanol amine, 0.72 g. dimethylamine, 111.7 g. water, 0.7 g. N-methyl-2-pyrrolidone, 10.9 g. n-butyl alcohol, 0.41 g. ethylene glycol n-butyl ether and sufficient nonylphenolethylene oxide adduct such that the resulting system had about 60 p.p.m. of the latter component. There resulted a clear stable solution at 32.1% solids with solution properties similar to those cited in Examples 43 and 44. About 0.8 g. of the solution was placed in an aluminum dish 5.5 cm. in diameter. The sample flowed out evenly and was cured using a stepwise cure of 15 min. at 150° C., 90 min. at 220° C., and 5 min. at 255° C. There resulted a clear, flexible, tough film exhibiting excellent adhesion to the aluminum substrate. A strip of coated aluminum containing 3.0 mil of the so-cured film was tested in the cut-through apparatus described in Examples 36–42 and found to have a cut-through of 264° C. As was found in Examples 36–42, titanium chelates offer a desirable acceleration of the cure of the polyester orthoamic acid diamine aqueous solution blends, and, furthermore, similar results can be obtained independent of whether the polymer blending operation is performed before or after the conversion of the separate polymers to water soluble polyelectrolytes. Additional studies indicate that the normal heat-bodying of a resin-solvent system to provide a preferred solids-viscosity relationship is best conducted on the resin blend with accelerator included before the resins have been converted to the water soluble polyelectrolyte form.

EXAMPLES 46–53

In a manner similar to that described in Example 35, a series of 9/1=ester/orthoamic acid diamine solution blends were prepared using 180.0 g. of each of the polyesters prepared as described in Examples 14–22, at solids levels ranging from 33.9 to 34.6%, and 18.8 g. of the orthoamic acid diamine prepared as described in Example 1, at 36.0% solids (as the cured film) as follows:

| Example 46. | 180.0 g. polyester of Example 14 + 18.8 g. orthoamic acid diamine of Example 1 |
|---|---|
| Example 47. | 180.0 g. polyester of Example 15 + 18.8 g. orthoamic acid diamine of Example 1 |
| Example 48. | 180.0 g. polyester of Example 16 + 18.8 g. orthoamic acid diamine of Example 1 |
| Example 49. | 180.0 g. polyester of Example 17 + 18.8 g. orthoamic acid diamine of Example 1 |
| Example 50. | 180.0 g. polyester of Example 18 + 18.8 g. orthoamic acid diamine of Example 1 |
| Example 51. | 180.0 g. polyester of Example 19 + 18.8 g. orthoamic acid diamine of Example 1 |
| Example 52. | 180.0 g. polyester of Example 20 + 18.8 g. orthoamic acid diamine of Example 1 |
| Example 53. | 180.0 g. polyester of Example 22 + 18.8 g. orthoamic acid diamine of Example 1 |

In each instance, the polyester was compatible with the orthoamic acid diamine, unlike the results found in Examples 24–34. In each instance, the blend was treated with a mixture of n-butyl alcohol, N-methyl-2-pyrrolidone, and the nonionic wetting agent as described in Example 35. The resulting clear solutions of polymer blends had a solids level ranging from 32 to 34%, a viscosity in the range of 260–480 cps., a pH range of 7.4–7.8, a surface tension in the range of 36.4–37.5 dynes/cm. and a solvent in the range of 80.0% by weight water. About 0.5 g. of each solution was placed in an aluminum dish about 5.5 cm. in diameter. The solutions flowed out evenly. The samples were placed in a forced-air oven set at 150° C. for 15 min. and then removed and examined. All films were found to be homogeneous, clear, and free of any phase separation. The cure was continued for 90 min. at 220° C. followed by 20 min. at 250° C. There resulted clear, tough 0.3–1.0 mil films exhibiting excellent adhesion to and flexibility on the aluminum substrate in every case. Another portion of each solution was placed on a copper substrate and another on an iron substrate and a doctor blade employed to draw uniform wet films. A similar cure schedule was employed and the resulting 0.2–0.5 mil films were found to be clear, tough and exhibiting excellent adhesion to the substrate as evidenced by no separation at the interface following considerable flexing in every case.

EXAMPLE 54–56

In a manner similar to that employed in Example 35 a series of aqueous polymer solution blends were attempted using 180.0 g. of the aqueous 33.6 solids polyester solution prepared as described in Example 21, and a quantity of each of the aqueous orthoamic acid dimaine solution prepared as described in Examples 2–5, such that the polyester to orthoamic acid diamine ratio was 9/1 by weight, as follows:

| | |
|---|---|
| Example 54 | 180.0 g. polyester solution of Example 21 + 18.8 g. diamide-diacid-diamine solution of Example 2. |
| Example 55 | 180.0 g. polyester solution of Example 21 + 27.8 g. diamide-diacid-diamine solution of Example 4. |
| Example 56 | 180.0 g. polyester solution of Example 21 + 26.2 g. diamide-diacid-diamine solution of Example 5. |

In sharp contrast to the results of Examples 28–34 in which a phase separation was obtained with a polyorthoamic acid polymer rich layer and a polyester polymer rich layer, clear solutions were obtained in each of Examples 54–56. Applying a cure schedule of 15 min. at 150° C., 90 min. at 220° C., 20 min. at 250° C. to about 0.5 g. of wet drawn film, there resulted homogeneous clear, tough 0.3–1.0 mil films exhibiting excellent adhesion and flexibility on aluminum, iron and copper substrates.

EXAMPLE 57

To a reactor equipped with a stirrer was charged 180.0 g. of a polyester at 33.6% solids prepared as described in Example 21 followed by 26.3 g. of the orthoamic acid diamine prepared as described in Example 3 at 25.6% solids (as the imide). Stirring was continued for a period of 15 min. The resin ratio of polyester to orthoamic acid diamine was at about 9/1. In sharp contrast to the result of Example 24 there resulted a clear solution with no evidence of phase separation. To the reactor with agitation was added 10.0 g. of a mixture of 9.5 g. n-butyl alcohol and 0.5 g. N-methyl-2-pyrrolidone containing a sufficient amount of nonylphenolethylene oxide adduct such that the resulting system had about 60 p.p.m. of the latter component. The resulting clear highly aqueous solution of the polymer blend had a solids level of 30.1%, a surface tension of 36.2 dynes/cm., a pH of 7.3 and a viscosity of 323 cps. at 24° C. The solvent in this system was in excess of 77% water. About 0.5 g. of the solution was placed in an aluminum dish about 5.5 cm. in diameter. The solution flowed out evenly. The sample was given a cure schedule of 150° C. for 15 min., 90 min. at 220° C., and 20 min. at 250° C. There resulted a clear, tough 0.3–1.0 mil film, exhibiting excellent adhesion to and flexibility on the aluminum substrate. Another portion of the solution was placed on a copper substrate and another on an iron substrate and a doctor blade employed to draw uniform wet films. A similar cure schedule was employed and the resulting 0.2–0.5 mil films were found to be clear, tough, and exhibiting excellent adhesion to the substrates as evidenced by no separation at the interface following considerable flexing.

The 31.1% solids solution was employed to cost 18 AWG wire, 0.0403 inch, copper and aluminum, using a conventional set of six wire enamel metering dies, namely, 0.043, 0.044, 0.044, 0.045, 0.045 and 0.046 inch diameter opening. Each of the wet drawn films was cured with the aid of forced-air ovens before the next layer of wet film was applied. The resulting films were smooth and concentric. The film build was 2.8 to 3.0 mil on the diameter. A description of the mechanical, chemical, electrical and thermal test methods have been presented above. Properties of the film included: 25% and 1X flexibility on copper; 15% and 1X flexibility on aluminum; repeated scrape of 18–30 strokes; resistance to 70/30 and 50/50 solvent; greater than 2000 v./mil; dielectric strength; 2X-3X in 155° heat shock; 2X-3X in 175° C. heat aging.

To the 31.1% solids polymer blend aqueous solution was added 1.0% triethanolamine titanium chelate by resin weight and the resulting clear solution was used to coat 18 AWG wire, copper and aluminum, using the conventional set of six wire enamel metering dies and forced-air oven cure as cited above. The resulting films were smooth and concentric. The film build was 2.8–3.0 mil on the diameter. Properties of the film included 25% and 1X flexibility on copper; 15% and 1X flexibility on aluminum; repeated scrape of 17–31 strokes; resistance to 70/30 and 50/50 solvent; dielectric strength in excess of 2000 v./mil; 2X-3X in the 155° C. heat shock; 2X-3X in 175° C. heat aging. No degradation of properties by inclusion of the accelerator was observed.

The six pass coated wire was overcoated with a conventional nylon wire enamel, namely, a 15% 6,6-Nylon dissolved in 70/30 cresylic acid/hydrocarbon solvent. This was accomplished with an 0.047 inch diameter die opening for the seventh pass. The wet drawn nylon film was cured with the aid of forced air ovens. The resulting film composite was smooth. A slight improvement was found in the heat shock test, namely, 1X-2X; the other properties cited above were found to be essentially unchanged.

EXAMPLE 58

To a reactor equipped with a stirrer was charged 100.0 g. of a polyester at 33.6% solids prepared as described in Example 21 followed by 17.2 g. of the orthoamic acid diamine prepared as described in Example 8 at 21.7% solids (as the cured film). Stirring was continued for a period of 15 min. The resin ratio of polyester to orthoamic acid diamine was at about 9/1. In sharp contrast to the result of Example 24, there resulted a clear solution with no evidence of phase separation. To the reactor, with agitation, was added 5.0 g. of a mixture of 4.5 g. n-butyl alcohol and 0.5 g. N-methyl-2-pyrrolidone containing a sufficient amount of a nonylphenolethylene oxide adduct such that the resulting system had about 60 p.p.m. of the latter component. About 0.5 g. of the solution was placed in an aluminum dish about 5.5 cm. in diameter. The solution flowed out evenly. The sample was placed in a forced-air oven set at 150° C. for 15 min. and then removed and examined. It was found to be a homogeneous clear film free of any phase separation. The cure was continued for 90 min. at 220° C. followed by 20 min. at 250° C. There resulted a clear, tough 0.3–1.0 mil film exhibiting excellent adhesion to and flexibility on the aluminum substrate. Another portion of the solution was placed on a copper substrate and another on an iron substrate and a doctor blade employed to draw uniform wet films. A similar cure schedule was employed and the resulting 0.2–0.5 mil films were found to be clear, tough, and exhibiting excellent adhesion to the substrates as evidenced by no separation at the interface following considerable flexing.

EXAMPLES 59–63

In a manner similar to that utilized in Example 58, a series of polymer solution blends were attempted using 100.0 g. of a polyester at 33.6% solids prepared as described in Example 21 and an appropriate amount of the orthoamic acid diamines described in Examples 9–13, in order to provide a 9/1=polyester to orthoamic acid diamine blend as follows:

| | |
|---|---|
| Example 59. | 100.0 g. polyester of Example 21 + 17.8 g. orthoamic acid diamine of Example 9. |
| Example 60. | 100.0 g. polyester of Example 21 + 17.2 g. orthoamic acid diamine of Example 10. |
| Example 61. | 100.0 g. polyester of Example 21 + 22.5 g. orthoamic acid diamine of Example 11. |
| Example 62. | 100.0 g. polyester of Example 21 + 23.9 g. orthoamic acid diamine of Example 12. |
| Example 63. | 100.0 g. polyester of Example 21 + 24.5 g. orthoamic acid diamine of Example 13. |

As in Example 58, and in sharp contrast to the results of Examples 24–34 where phase separations occurred resulting in polyester-rich and polyimide prepolymer-rich layers, clear solutions were obtained in Examples 58–63. As in Example 58, each of the solutions in Examples 59–63 was treated with a mixture of n-butyl alcohol and N-methyl-2-pyrrolidone (at 5.0 g./100 g. polyester solution) and a nonionic surfactant. Applying a cure schedule of 15 min. at 150° C., 90 min. at 220° C., and 20 min. at 255° C. to wet drawn films, there resulted homogeneous clear, tough 0.3–1.0 mil films exhibiting excellent adhesion and flexibility on aluminum, iron and copper substrates in all cases.

EXAMPLE 64

To the polymer blend of Example 59 and 30.5% solids, which in turn employed the polyester of Example 21 and the M(AM)$_x$AM orthoamic acid diamine of Example 9 where x=3, was added 1% triethanolamine titanium chelate by weight of resin solids. About 0.8 g. was placed in an aluminum dish 5.5 cm. in diameter. The sample flowed out evenly and was cured using a stepwise cure of 15 min. at 150° C., 90 min. at 220° C., and 5 min. at 255° C. There resulted a clear, flexible, tough film exhibiting excellent adhesion to the aluminum substrate. A strip of coated aluminum containing 3.0 mil of the cured film was tested and compared to a similarly prepared film of Example 59 in the cut-through apparatus described in Examples 36–42, and found to have a cut-through of 249° C. as compared to a cut-through of 179° C. for Example 59 where no accelerator was employed. When the time in the cure schedule for Example 59 was extended from 5 min. at 255° C. to 50 min. at 255° C., the cut-through was 245° C. for Example 59.

The 30.5% solids solution with the 1.0% accelerator was employed to coat 18 AWG wire, 0.0403 inch, copper and aluminum, using a conventional set of six wire enamel metering dies and cured with the aid of forced-air ovens as described in Example 57. The resulting films were smooth and concentric. The film build was 2.8–3.0 mil on the diameter. Properties of the film included: 25% and 1X flexibility on copper; 15% and 1X flexibility on aluminum; 70/30 and 50/50 solvent resistance; greater than 2000 v./mil dielectric strength; 2X-3X 155° C. heat shock; 2X-3X 175° C. heat aging.

The six pass coated wire was given a seventh "overcoat" treatment with conventional Nylon wire enamel as described in Example 57. All properties were found to be essentially unchanged with exception of heat shock which showed a slight improvement to 1X-2X.

EXAMPLE 65

To the polymer blend of Example 62 at 29.0% solids, which in turn employed the polyester of Example 21 and the M(BM)$_x$BM of Example 12 where x=3, was added 1% triethanolamine titanium chelate by weight of resin solids. About 0.5 g. was placed in an aluminum dish 5.5 cm. in diameter. The sample flowed out evenly and was cured, using a stepwise cure of 15 min. at 150° C., 90 min. at 220° C., and 5 min. at 255° C. There resulted a clear, tough, flexible 0.2–0.8 mil film exhibiting excellent adhesion to the aluminum substrate. With the aid of a doctor blade wet films were drawn on copper and iron substrates. A similar cure schedule was applied resulting in 0.2–0.5 mil clear films exhibiting excellent adhesion to the substrates as evidenced by no separation at the interface following considerable flexing. A 1.0 g. sample was placed in the aluminum dish and the above cure applied to form a 3.0 mil film. Using the cut-through apparatus described in Examples 36–42, the cured film was found to have a cut-through of 254° C. as compared to a cut-through of 182° C. for a similarly prepared film of Example 62 where no accelerator was employed. When the time in the cure schedule of Example 62 was extended from 5 min. at 255° C. to 50 min. at 255° C., the cut-through was 247° C. for Example 62.

The 29.0% solids solution with the 1.0% accelerator was employed to coat 18 AWG wire, 0.0403 inch, copper and aluminum, using a conventional set of six wire enamel metering dies and cured with the aid of forced-air ovens as described in Example 57. The resulting films were smooth and concentric. The film build was 2.8–3.0 mil on the diameter. Properties of the film included: 25% and 1X elongation of copper; 15% and 1X elongation on aluminum; 70/30 and 50/50 solvent resistance; dielectric strength in excess of 2000 v./mil; 2X-3X 155° C. heat shock resistance; 2X-3X performance in the 175° C. heat aging test.

EXAMPLE 66

To a reactor, equipped with a stirrer, was charged 180.0 g. of the aqueous orthoamic acid diamine solution prepared as described in Example 1 at 36.0% solids (as the cured film), followed by 20.0 g. of an aqueous 33.6% solids polyester solution prepared as described in Example 21.

Stirring was continued for a period of 15 min. The ratio of polyester to orthoamic acid diamine was at about 1/9 by weight. There resulted a clear solution with no evidence of phase separation. The solution was metered onto aluminum, iron and copper substrates with the aid of a doctor blade. The samples were placed in a forced-air oven set for a cure schedule of 15 min. at 150° C., 90 min. at 220° C., and 60 min. at 250° C. In each instance there resulted tough, clear 0.2–0.5 mil films exhibiting excellent adhesion and flexibility.

EXAMPLE 67

The procedure described in Example 66 was repeated with the exception that an equal weight of the orthoamic acid diamine solution and of the polyester were employed, resulting in a resin ratio of about one-to-one by weight. There resulted a clear solution, with no evidence of phase separation. The same procedure of film formation and cure was employed on the three cited substrates. In each instance, there resulted tough, clear, films exhibiting excellent adhesion and flexibility.

EXAMPLE 68

To a reactor, equipped with a was charged 180.0 g. of the aqueous 33.6% solids polyester solution prepared as described in Example 21, followed by 16.0 g. of the aqueous 36.0% solids (cured) orthoamic acid diamine solution prepared as described in Example 1. Stirring was continued for a period of 15 min. With stirring, 4.0 g. of a 35.0% solids aqueous solution of a low viscosity, liquid, phenolic resin, commercially available as BRLA 2854 from Union Carbide Corporation, was added over a period of 2 min., and the stirring continued for another 15 min. There resulted a clear solution. The resulting solids ratio was about 90/2/8, i.e., polyester/phenolic/orthoamic acid diamine. The solution was metered onto aluminum, iron and copper substrates with the aid of a doctor blade. The samples were placed in forced-air ovens set for a cure schedule of 15 min. at 150° C., 90 min. at 220° C. and 60 min. at 250° C. There resulted clear, tough, 0.2–0.5 mil films exhibiting excellent adhesion and flexibility on all three substrates.

EXAMPLE 69

To a reactor, equipped with a stirrer was charged 180.0 g. of the aqueous 33.6% solids polyester solution prepared as described in Example 21, followed by 10.0 g. of the aqueous 36.0% solids orthoamic acid diamine solution prepared as described in Example 1. After about 15 min. of stirring, 10.0 g. of BRLA 2854 (see Example 68) was trickled in over a 2 min. period and stirring was continued for an additional 15 min. There resulted a clear solution with a solids ratio of about 90/5/5, i.e., polyester/phenolic/orthoamic acid diamine. With the aid of a doctor blade and following curing in forced-air ovens as described in Example 68, there resulted clear, tough, 0.2–0.5 mil films exhibiting excellent adhesion and flexibility on aluminum, iron and copper.

EXAMPLE 70

To a reactor, equipped with a stirrer, was charged 180.0 g. of the aqueous, 33.6% solids polyester solution prepared as described in Example 21, followed by 16.0 g. of the aqueous 36.0% solids orthoamic acid diamine solution prepared as described in Example 1. Stirring was continued for a period of 15 min. With stirring, 4.0 g. of a 35.0% solids 80/20 aqueous alcoholic solution of a commercial grade of hexamethoxymethylmelamine, aminoplast resin, such as Cymel 301 from American Cyanamid Company, was trickled in with stirring over a period of 2 min. The stirring was continued for an additional 15 min. The resulting resin solids ratio was about 90/2/8, i.e., polyester/aminoplast/orthoamic acid diamine. With the aid of a doctor blade and following curing in the forced-air ovens as described in example 68, there resulted clear, tough, 0.2–0.5 mil films exhibiting excellent adhesion and flexibility on aluminum, iron and copper.

EXAMPLE 71

To a reactor equipped with a stirrer was charged 180.0 g. of the polyester at 33.6% solids prepared as described in Example 15 followed by 10.0 g. of the orthoamic acid diamine prepared as described in Example 1 at 36.0% solids. After 15 min. of stirring, 10.0 g. of Cymel 301 (see Example 70) was trickled in with stirring over 2 min. and the stirring continued for an additional 15 min. There resulted a clear solution with a resin ratio of about 90/5/5, i.e., polyester/aminoplast/orthoamic acid diamine. With the aid of a doctor blade and forced air ovens and a cure schedule as described in Example 70, there resulted clear, tough 0.2–0.5 mil films exhibiting excellent adhesion and flexibility on aluminum, iron and copper.

EXAMPLE 72

To a reactor, equipped with a stirrer, was charged 180.0 g. of the aqueous 33.6% solids polyester solution prepared as described in Example 21, followed by 16.0 g. of the aqueous 36.0% solids orthoamic acid diamine solution prepared as described in Example 1. Stirring was continued for a period of 15 min. With stirring, 4.0 g. of a 35.0% solids water soluble epoxy resin, such as Araldite DP-630 from Ciba-Geigy Corporation, was trickled in, with stirring, over a period of 2 min. The stirring was continued for an additional 15 min. The resulting resin solids ratio was about 90/2/8, i.e., polyester/expoly/orthoamic acid diamine. The solution was metered onto aluminum, iron and copper substrates with the aid of a doctor blade. The samples were placed in forced-air ovens for a cure schedule of 15 min. at 150° C., 90 min. at 220° C. and 20 min. at 250° C. There resulted clear, tough, 0.2–0.5 mil films exhibiting excellent adhesion and flexibility on all three substrates.

EXAMPLE 73

To a reactor, equipped with a stirrer, was charged 180.0 g. of the aqueous 33.6% solids polyester solution prepared as described in Example 21, followed by 10.0 g. of the aqueous 36.0% solids orthoamic acid diamine solution prepared as described in Example 1. After 15 min. of stirring, 10.0 g. of Araldite DP 630 epoxy was trickled in, with stirring, over 2 min., and the stirring continued for an additional 15 min. There resulted a clear solution with a solids ratio of about 90/5/5, i.e., polyester/epoxy/orthoamic acid diamine. With the aid of a doctor blade and following the forced-air oven cure schedule described in Example 68, there resulted clear, tough, 0.2–0.5 mil films exhibiting excellent adhesion and flexibility on aluminum, iron and copper.

EXAMPLE 74

To a reactor equipped with a stirrer was charged 180.0 g. of the polyester at 33.6% solids prepared as described in Example 14, followed by 18.9 g. of the orthoamic acid diamine prepared as described in Example 3 at 28.4% solids (as the cured film). Stirring was continued for 15 min. With stirring, 3.84 g. of a 35.0% solids aqueous solution of a low viscosity liquid phenolic resin, commercially available as BRL 1031 from Union Carbide Corporation, was added over a period of 2 min., and the stirring continued for another 15 min. The resulting homogeneous, clear, solution had a resin ratio of polyester/phenolic/orthoamic acid diamine of about 90/2/8. To the reactor, with agitation, was added 10.0 g. of a mixture of 9.5 g. n-butyl alcohol and 0.5 g. N-methyl-2-pyrrolidone containing a sufficient amount of nonylphenolethylene oxide adduct such that the resulting system had about 60 p.p.m. of the latter component. The resulting clear aqueous solution of the polymer blend had a solids level of 31.6%, a surface tension of 36.2 dynes/cm., a pH of 7.4 and a viscosity of 377 cps. at 24° C. The solvent in this system was in excess of 80% water. The solution was metered onto aluminum, copper and iron substrates with the aid of a doctor blade. The samples were placed in forced-air ovens set for a cure schedule of 15 min. at 150° C., 90 min. at 220° C., and 20 min. at 250° C. There resulted clear, tough 0.2–0.5 mil films exhibiting excellent adhesion and flexibility on all three substrates as evidenced by no separation at the interface following considerable flexing.

The 31.6% solids solution was employed to coat 18 AWG wire, 0.0403 inch, copper and aluminum, using a conventional set of six wire enamel metering dies and cured with the aid of forced-air ovens as described in Example 57. The resulting films were smooth and concentric, the film build was 2.8 to 3.0 mil on the diameter. Properties of the film included: 25% and 1X-2X flexibility on copper; 15% and 1X flexibility on aluminum; 70/30 and 50/50 solvent resistance; dielectric strength in excess of 2000 v./mil; 2X-3X heat shock in the 155° C. test; 2X-3X in the 175° C. heat aging test.

To the 31.6% solids polymer blend aqueous solution was added 1% ammonium lactate titanium chelate by resin weight, and the resulting clear solution was used to coat 18 AWG wire, copper and aluminum, using the conventional set of six wire enamel metering dies and forced-air oven cure as cited above. The resulting films were smooth and concentric. The film build was 2.8–3.0 mil on the diameter. Properties of the film included: 25% and 1X-2X flexibility on copper; 15% and 1X on aluminum; 70/30 and 50/50 solvent resistance; dielectric strength in excess of 2000 v./mil; 2X-3X 155° C. heat shock; 2X-3X 175° C. heat aging.

EXAMPLE 75

To a reactor equipped with a stirrer was charged 180.0 g. of the polyester prepared as described in Example 17 at 34.2% solids followed by 21.0 g. of the orthoamic acid diamine prepared as described in Example 7 at 26.1% solids (as the cured film). After 15 min. of additional stirring, 3.91 g. of a 35.0% 80/20 aqueous alcoholic solution of hexamethoxymethylmelamine, (Cymel 301, from American Cyanamid Company), was trickled in with stirring over a period of 2 min. The stirring was continued for an additional 15 min. The resulting resin blend ratio was about 90/2/8, i.e., polyester/"aminoplast"/orthoamic acid diamine. To the reactor, with agitation, was added 10.0 g. of a mixture of 9.5 g. n-butyl alcohol and 0.5 g. N-methyl-2-pyrrolidone containing a sufficient amount of nonylphenolethylene oxide adduct such that the resulting system had about 60 p.p.m. of the latter component. The resulting clear aqueous solution of the polymer blend had a solids level of 31.8%, a surface tension of 35.8 dynes/cm., a pH of 7.4 and a viscosity of 416 cps. at 24° C. The solvent in this system was in excess of 80% water. The solution was metered onto aluminum, copper and iron substrates with the aid of a doctor blade. The samples were placed in forced air ovens set for a cure schedule of 15 min. at 150° C., 90 min. at 220° C. and 20 min. at 250° C. There resulted clear, tough 0.2–0.5 mil films exhibiting excellent adhesion and flexibility on all three substrates.

The 31.8% solids solution was employed to coat 18 AWG wire, 0.0403 inch, copper and aluminum, using a conventional set of six wire enamel metering dies and cured with the aid of forced-air ovens as per Example 57. The resulting films were at a 2.8–3.0 mil build on the diameter and were found to be smooth and concentric. Properties of the film included: 25% and 1X-2X flexibility on copper; 15% and 1X on aluminum; 70/30 and 50/50 solvent resistance; greater than 2000 v./mil dielectric strength in the twisted pair test; 2X-3X heat shock in the 155° C. test; 2X-3X in the 175° C. heat aging test.

While certain illustrative embodiments and modifications of the present invention have been described in considerable detail, it should be understood that there is no intention to limit the invention to the specific forms disclosed. On the contrary, the intention is to cover all embodiments, modification, alternatives, equivalents and uses falling within the spirit and scope of the invention as expressed in the appended claims.

I claim as my invention:

1. A coating composition for application to a substrate from an aqueous solution comprising the admixture of a water soluble film forming polyester resin and a water soluble aromatic oligorthoamic acid di-primary amine.

2. An aqueous base resin coating composition comprising, the admixture of a water soluble film forming polyester resin and a water soluble aromatic digorthoamic acid di-primary amine in the weight ratio of between about 0.1 and 10 parts polyester per part of diamine, said composition having a solids content of between about 25% and 40% by weight, a coating of said composition on a substrate being curable upon the application of heat to form a cured resin coating on said substrate.

3. A coating composition for application to a substrate from an aqueous solution comprising the admixture of between about 1 and about 10 parts by weight of a water soluble film forming polyester resin, and between about 1 and about 10 parts by weight of a water soluble aromatic oligorthoamic acid di-primary amine, a coating of said composition on a substrate being heat curable to form a cured resin coating on said substrate.

4. The coating composition defined in claim 3 wherein the admixture includes up to about 10 parts by weight of a water soluble phenol-formaldehyde resin.

5. The coating composition defined in claim 3 wherein the admixture further includes up to about 10 parts by weight of a water soluble epoxy resin.

6. THe coating composition defined in claim 3 wherein the admixture further includes up to about 10 parts by weight of a water soluble aminoplast resin.

7. The coating composition defined in claim 3 wherein said aromatic oligorthoamic acid di-primary amine is the reaction product of an aromatic diamine and an aromatic dianhydride in the molar ratio of two-to-one respectively.

8. The coating composition defined in claim 3 wherein said aromatic oligorthoamic acid di-primary amine is a diamide diacid diamine.

9. The coating composition defined in claim 3 wherein said water soluble aromatic oligorthoamic acid di-primary amine comprises the reaction product of an aromatic diamine and an aromatic dianhydride, in the molar ratio of m to m-1) respectively, where m has a value of from 2 to about 7, with the addition to said reaction product of a volatile nitrogen containing base in an amount sufficient to make the reaction product water soluble.

10. The coating composition defined in claim 3 wherein said aromatic oligorthoamic acid di-primary amine is the reaction product of an aromatic diamine and an aromatic dianhydride in the molar ratio of m to (m-1) respectively, where m has a value of from 2 to about 7.

11. The coating composition defined in claim 10 wherein said aromatic diamine is selected from the group consisting of:

aromatic diamines having the general formula:

H$_2$N-R'-NH$_2$ wherein R' is a divalent radical selected from the group consisting of

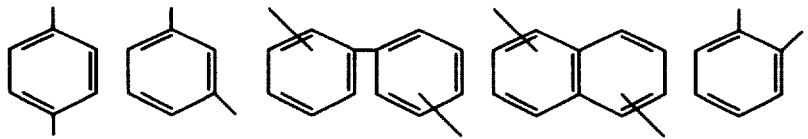

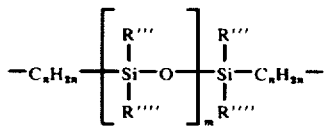

wherein R''' is an aryl group and '''' is an alkyl or an aryl group having 1 to 6 carbon atoms, n is an integer of from 1 to 4 and m has a value of 0, 1 or more and

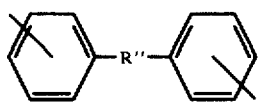

wherein R'' is selected from the group consisting of an alkylene chain having 1–3 carbon atoms,

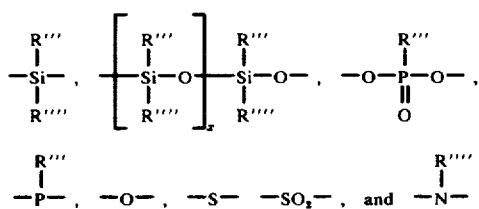

wherein R''' and R'''' are as above-defined and x is an integer of at least 0.

12. The coating composition defined in claim 10 wherein said aromatic diamine is selected from the group consisting of
p,p'-methylenedianiline
p,p'-oxydianiline and
m-phenylenediamine;

and said aromatic dianhydride is selected from the group consisting of
3,3',4,4'-benzophenonetetracarboxylic dianhydride, and
4,4'-(2-acetoxy-1,3-glyceryl)-bis-anhydrotrimellitate.

13. The coating composition defined in claim 3 wherein said water soluble film forming polyester comprises the reaction product of an aromatic acid or anhydride selected from the group consisting of trimellitic anhydride, trimellitic acid, terephthalic acid, isophthalic acid and mixtures thereof, and a polyhydroxyl selected from the group consisting of neopentyl glycol, propylene glycol, butylene 1,3-glycol, diethylene glycol, glycerine, trishydroxyethylisocyanurate, and mixtures thereof.

14. The coating composition defined in claim 13 wherein said water soluble film forming polyester further includes an aliphatic dibasic acid.

15. A substrate having a coating thereon produced by applying thereof a film of the composition defined in claim 3 followed by heat curing of the film.

16. A metal wire having a coating thereon produced by applying thereto a film of the composition defined in claim 3 followed by heat curing of the film.

17. A process for coating a substrate comprising the steps of applying to said substrate a coating of the composition defined in claim 3 and curing said coating.

18. A process for producing magnet wire comprising the steps of applying to a wire a coating of the composition defined in claim 13 and curing said coating.

19. A metal wire having a coating thereon produced by applying thereto a film of the composition defined in claim 3 followed by heat curing of the film and with a Nylon overcoating over said cured coating.

20. A process for producing magnet wire comprising the steps of applying to a wire a coating of the composition defined in claim 13, curing said coating, and applying a Nylon overcoating onto said cured coating.

21. The coating composition defined in claim 9 including the addition of an organometallic accelerator.

22. The composition of claim 21 wherein said organometallic accelerator is selected from the group consisting of the titanium chelates.

23. The coating composition defined in claim 9 including the addition thereto of a flow control agent.

24. The composition of claim 23 wherein said flow control agent is selected from the group consisting of fluorocarbon surfactants, carboxypropyl terminated dimethylsiloxane polymer flow agents, nonylphenoxypoly(ethyleneoxy)ethanol. and a mixture of cresylic acidphenol blend with n-butyl alcohol.

25. A process for coating a substrate comprising the steps of applying to said substrate a coating of the composition defined in claim 21 and curing said coating.

26. A process for coating a substrate comprising the steps of applying to said substrate a coating of the composition defined in claim 24 and curing said coating.

27. A process for coating a substrate as defined in claim 26 including the step of applying a Nylon overcoating to the cured coating.

28. A process for producing magnet wire comprising applying to a wire a coating of the composition defined in claim 12, curing said coating, and applying a Nylon overcoating to said cured coating.

29. The coating composition of claim 12 including the addition of a flow control agent and an organometallic curing accelerator.

30. A process for producing magnet wire comprising the steps of applying to a wire a coating of the composition defined in claim 29, curing said coating, and applying a Nylon overcoating to said cured coating.

31. Magnet wire comprising a wire substrate having a coating thereon produced by the application and cure thereon of a coating of the composition defined in claim 29.

32. Magnet wire as defined in claim 31, including a Nylon overcoating.

33. A coating composition for application to a substrate from an aqueous solution comprising the admixture of between about 1 and about 10 parts by weight of a water soluble polyester resin having an acid value of from about 45 to about 80 and a hydroxyl value of about 100 to about 200; and between about 1 and about 10 parts by weight of a water soluble aromatic orthoamic acid diamine reaction product of an aromatic diamine and an aromatic dianhydride in the molar ratio of m to (m-1) respectively, where m has a value of from 2 to about 7; said admixture having an aromatic to aliphatic molar ratio of between about 25 and about 50 percent aromatic; a coating of said composition on a substrate being heat curable to form a cured resin coating on said substrate.

34. A process for coating a substrate comprising the steps of applying to said substrate a coating of the composition defined in claim 33, and curing said coating.

35. A process for producing magnet wire comprising the steps of applying to a wire a coating composition as defined in claim 33, curing said coating, and applying a Nylon overcoating to said cured coating.

36. Magnet wire comprising a wire substrate having a coating thereon produced by the application and cure thereon of a coating of the composition defined in claim 33.

37. Magnet wire as defined in claim 36 including a Nylon overcoating.

* * * * *

UNITED STATES PATENT AND TRADEMARK OFFICE
CERTIFICATE OF CORRECTION

PATENT NO. : 4,004,062
DATED : January 18, 1977
INVENTOR(S) : Marvin A. Peterson It is certified that error appears in the above-identified patent and that said Letters Patent are hereby corrected as shown below:

```
Col.  2, line 66, after "of" insert --a--.

line 31, delete "cutthrough" and insert --cut through--.
Col. 10, line 30, delete "polymeic" and insert --polymeric--;
         line 54, delete "phenolformalde-" and insert
                  --phenol-formalde--.
Col. 11, line 31, delete "monomerics"(first occurrence)and insert --No.--
Col. 13, line 48, delete "diamide-diaciddiamines" and insert
                  --diamide-diacid-diamines--.
Col. 14, line 26, delete "diamide-diaciddiamines" and insert
                  --diamide-diacid-diamines--.
Col. 18, line 23, delete "O⁻X⁺" and insert --O⊕X⊖--;
         line 27, delete "⁺X⁻O" and insert --⊕X⊖O--;
         line 39, delete "MDA" and insert --"MDA"--;
         line 39, delete "M" and insert --"M"--
         line 42, delete "B" and insert --"B"--.
Col. 19, line 17, delete "diaciddiamine" and insert --diacid-
                  diamine--.
Col. 20, line 25, after "," (comma) insert --ammonium hydroxide,--
Col. 21, line  8, delete "phenolformaldehyde" and insert
                  --phenol-formaldehyde--;
         line 32, delete "24" and insert --24--;
         line 64, delete "off" and insert --of--.
Col. 24, line 24, delete "4' benzophenonetetracorboxylic" and
                  insert --4'- benzophenonotetracarboxylic--;
         line 68, delete "M" and insert --N--.
```

UNITED STATES PATENT AND TRADEMARK OFFICE
CERTIFICATE OF CORRECTION

PATENT NO. : 4,004,062

DATED : January 18, 1977

INVENTOR(S) : Marvin A. Peterson

Page 2 of 2

It is certified that error appears in the above-identified patent and that said Letters Patent are hereby corrected as shown below:

```
                       same line, delete "of" (second occurrence)
                       and insert --1, 3--;
            line 37, delete "pf" and insert --of--.
Col. 28, line  6, delete "orthomic" and insert --orthoamic--.
Col. 35, line 15, delete "aluminium" and insert --aluminum--.
Col. 43, line 15, after "a" (second occurrence) insert
                       --stirrer--.
Col. 44, line 33, delete "expoly" and insert --epoxy--.
Col. 46, line 35, delete "digor-" and insert --oligor- --;
            line 58, delete "THe" and insert --The--.
Col. 47, line  5, delete "m-1)" and insert --(m-1)--;
            line 39, delete "   ''''" and insert --R''''--.
```

Signed and Sealed this

Eleventh Day of July 1978

[SEAL]

Attest:

RUTH C. MASON
Attesting Officer

DONALD W. BANNER
Commissioner of Patents and Trademarks